(12) United States Patent
Li

(10) Patent No.: US 11,902,774 B2
(45) Date of Patent: Feb. 13, 2024

(54) METHOD FOR STARTING VEHICLE AND RELATED DEVICE

(71) Applicant: HUAWEI CLOUD COMPUTING TECHNOLOGIES CO., LTD., Gui'an New District (CN)

(72) Inventor: Fei Li, Shenzhen (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 209 days.

(21) Appl. No.: 17/486,576

(22) Filed: Sep. 27, 2021

(65) Prior Publication Data

US 2022/0014906 A1    Jan. 13, 2022

Related U.S. Application Data

(63) Continuation of application No. PCT/CN2020/082174, filed on Mar. 30, 2020.

(30) Foreign Application Priority Data

Mar. 28, 2019 (CN) .......................... 201910243896.9

(51) Int. Cl.
*G06F 21/00* (2013.01)
*H04W 12/02* (2009.01)
*G06F 21/60* (2013.01)

(52) U.S. Cl.
CPC .......... *H04W 12/02* (2013.01); *G06F 21/606* (2013.01)

(58) Field of Classification Search
CPC ..... H04W 12/02; H04W 12/043; H04W 4/40; G06F 21/606; B60R 25/24;
(Continued)

(56) References Cited

U.S. PATENT DOCUMENTS 10,075,576 B1 *   9/2018   Rule .................... H04W 12/50
2015/0066892 A1 * 3/2015   Astore ................ G06F 16/9536
                                                                    707/707

(Continued)

FOREIGN PATENT DOCUMENTS

CN        103188313 A       7/2013
CN        105083218 A      11/2015
(Continued)

OTHER PUBLICATIONS

Zeadally, S., Guerrero, J. & Contreras, J. A tutorial survey on vehicle-to-vehicle communications. Telecommun Syst 73, 469-489 ( 2020). https://doi.org/10.1007/s11235-019-00639-8 (Year: 2020).*

*Primary Examiner* — Kendall Dolly
(74) *Attorney, Agent, or Firm* — Leydig, Voit & Mayer, Ltd.

(57) ABSTRACT

A method for starting a vehicle and a related device are provided. The method includes: a server sends first security information and second security information to a mobile terminal and a telematics box respectively through an encrypted secure transmission channel or an encrypted secure transmission protocol, so that the telematics box can verify, by using the first security information and the second security information, a vehicle start instruction sent by the mobile terminal. When the verification succeeds, the telematics box controls the vehicle to start. According to the application, plaintext transmission of the security information between the mobile terminal and the telematics box is avoided, thereby avoiding leakage of the security information, and reducing a risk that the vehicle is maliciously started. In addition, a transmission process of the security information may not be restricted by a distance between the vehicle and the mobile terminal.

20 Claims, 10 Drawing Sheets

Mobile terminal 101

Server 102

Telematics box 103

(58) Field of Classification Search
CPC .............. B60R 25/2018; B60R 25/209; B60R 2325/106; B60R 2325/205; H04L 2209/84
See application file for complete search history.

(56) References Cited

U.S. PATENT DOCUMENTS

| | | | |
|---|---|---|---|
| 2016/0203661 A1* | 7/2016 | Pudar | G07C 9/00571 |
| | | | 340/5.25 |
| 2016/0344747 A1* | 11/2016 | Link, II | H04W 4/80 |
| 2018/0184288 A1* | 6/2018 | De Lorenzo | H04L 63/107 |
| 2018/0334138 A1* | 11/2018 | Namineni | G06F 1/3231 |
| 2019/0036739 A1* | 1/2019 | Lindskog | H04L 25/0226 |
| 2020/0322332 A1* | 10/2020 | Haque | H04L 63/0442 |
| 2022/0326938 A1* | 10/2022 | Wang | H04W 12/03 |

FOREIGN PATENT DOCUMENTS

| | | | |
|---|---|---|---|
| CN | 105427423 A | 3/2016 |
| CN | 106059754 A | 10/2016 |
| CN | 107888612 A | 4/2018 |
| JP | 2016154300 A | 8/2016 |
| WO | 2018060561 A1 | 4/2018 |
| WO | 2018230025 A1 | 12/2018 |

\* cited by examiner

METHOD FOR STARTING VEHICLE AND RELATED DEVICE

CROSS-REFERENCE TO RELATED APPLICATIONS

This application is a continuation of International Application No. PCT/CN2020/082174, filed on Mar. 30, 2020, which claims priority to Chinese Patent Application No. 201910243896.9, filed on Mar. 28, 2019. The disclosures of the aforementioned applications are hereby incorporated by reference in their entireties.

TECHNICAL FIELD

Embodiments of this application relate to the field of communications technologies, and in particular, to a method for starting a vehicle and a related device.

BACKGROUND

As a physical entity component, a conventional car key is very inconvenient in daily use. For example, a user needs to carry the car key, and the car key is prone to get lost. To resolve these problems, with development of mobile communications technologies, some virtual vehicle keys used on a mobile terminal can be used to start a vehicle. Therefore, the user may use the mobile terminal to initiate a start instruction to a telematics box on the vehicle, to start the vehicle. The mobile terminal usually communicates with the telematics box through NFC or Bluetooth. However, this enables security information such as a key used to start the vehicle to be transparently transmitted between the telematics box and the mobile terminal, and the key is subject to leakage. Consequently, the vehicle may be maliciously started.

SUMMARY

Embodiments of this application provide a method for starting a vehicle and a related device, to prevent security information that is used to start the vehicle from being transparently transmitted and avoid leakage of the security information, thereby reducing a possibility that the vehicle is maliciously started.

According to a first aspect, an embodiment of this application provides a method for starting a vehicle. The method includes: A server obtains first security information and second security information that are of the vehicle. The first security information and the second security information are used to verify a vehicle start instruction sent by a mobile terminal to a telematics box. The server sends the first security information and indication information of the vehicle to the mobile terminal through a secure transmission protocol or a secure transmission channel, and sends the second security information and a user identifier of the mobile terminal to the telematics box of the vehicle. The indication information is used to identify the vehicle. It can be learned that the server may send the obtained first security information and the obtained second security information to the mobile terminal and the telematics box respectively, so that the vehicle start instruction sent by the mobile terminal to the telematics box can be verified by using the first security information and the second security information. In this way, when the verification succeeds, the telematics box controls the vehicle to start. In this way, when security information, for example, a key is transmitted from the server to the mobile terminal and the telematics box, the security information may be protected by an internet protocol, thereby avoiding the security information from being transparently transmitted, avoiding leakage of the security information, and reducing a risk that the vehicle is maliciously started. In addition, even if the vehicle is relatively far away from the mobile terminal, the telematics box and the mobile terminal can still obtain the security information sent by the server. Therefore, a transmission process of the security information may not be restricted by a distance between the vehicle and the mobile terminal.

With reference to the first aspect, in a first possible implementation of the first aspect, the method further includes: The server receives a first vehicle start instruction sent by the mobile terminal. The first vehicle start instruction carries the indication information and first verification information that is obtained based on the first security information. The server sends a second vehicle start instruction to the telematics box based on the indication information. The second vehicle start instruction carries the user identifier and second verification information that is obtained based on the second security information. The server receives a first verification result obtained after the telematics box verifies the second verification information, and sends the first verification result to the mobile terminal. In this implementation, compared with a manner of performing communication between the mobile terminal and the telematics box by using a near field communication technology, a manner of performing communication between the mobile terminal and the telematics box by using the server through a wireless network can reduce power consumption of the telematics box. In addition, the vehicle start instruction sent by the mobile terminal to the telematics box may be transmitted by using the server, and the server transmits the vehicle start instruction to the telematics box. In this way, a communication process between the mobile terminal and the vehicle may not be restricted by a distance between the terminal and the vehicle.

With reference to the first possible implementation of the first aspect, in a second possible implementation of the first aspect, the first security information and the second security information are same security information, and the first verification information and the second verification information are same verification information. In this implementation, if the security information and the verification information that are delivered by the server to the mobile terminal are the same as the security information and the verification information that are delivered by the server to the telematics box, the telematics box and the mobile terminal may verify the vehicle start instruction based on the same security information and the same verification information.

With reference to the first possible implementation of the first aspect, in a third possible implementation of the first aspect, the first security information and the second security information are different security information, and the first verification information and the second verification information are different verification information. That the server sends the second vehicle start instruction to the telematics box based on the indication information includes: The server obtains the first security information based on the indication information, and verifies the first verification information based on the first security information. If the verification on the first verification information succeeds, the server obtains the second security information based on the user identifier, and generates the second verification information based on the second security information. The server sends, to the telematics box based on an identifier of the vehicle, the second vehicle start instruction that carries the second verification information. In this implementation, the server verifies, by using the first verification information, the first vehicle start instruction sent by the mobile terminal, that is, verifies the mobile terminal, and sends the generated second vehicle start instruction to the telematics box, so that the telematics box verifies the second vehicle start instruction based on the second verification information. In this way, verification is performed twice in a process in which the mobile terminal starts the vehicle, thereby improving security of starting the vehicle.

With reference to any one of the first possible implementation to the third possible implementation of the first aspect, in a fourth possible implementation of the first aspect, both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number. In this implementation, the verification information is generated based on the random number and the security information, so that even if the verification information used to verify the vehicle start instruction is maliciously stolen, the security information stored between the mobile terminal and the telematics box is not leaked. In this way, security of storing the security information in the mobile terminal and the telematics box is improved. In addition, in this implementation, the random number is sent by the mobile terminal to the telematics box, so that the telematics box does not need to continuously broadcast, to the mobile terminal, a random number required for verifying the vehicle start instruction, thereby reducing power consumption of the telematics box.

With reference to the fourth possible implementation of the first aspect, in a fifth possible implementation of the first aspect, the first security information is generated based on a first root key, the user identifier, and the identifier of the vehicle; and the second security information is generated based on a second root key, the user identifier, and the identifier of the vehicle. In this implementation, the root key, the user identifier, and the identifier of the vehicle are used to generate the security information, so that even if the security information is maliciously stolen, the root key on the server is not leaked. Therefore, the server may continue to generate security information for more mobile terminals and telematics boxes based on the root key.

With reference to any one of the first possible implementation to the fifth possible implementation of the first aspect, in a sixth possible implementation of the first aspect, that the server generates first security information and second security information is specifically: The server generates the first security information and the second security information if a second verification result sent by the telematics box to the mobile terminal is received and the second verification result indicates that the verification succeeds. Alternatively, the server generates the first security information and the second security information in response to a registration request of the mobile terminal for the telematics box. In this implementation, after the mobile terminal successfully starts the vehicle, the server updates the security information of the mobile terminal and the telematics box, so that the security information stored in the mobile terminal and the telematics box is not unchangeable, thereby improving security of starting the vehicle. In addition, when the mobile terminal registers with the telematics box, the server generates the security information for the mobile terminal and the telematics box, so that the registered telematics box and the registered mobile terminal can obtain the security information used to verify the vehicle start instruction, and the mobile terminal starts the vehicle based on the security information.

With reference to the sixth possible implementation of the first aspect, in a seventh possible implementation of the first aspect, the method further includes: The server creates registration information in response to the registration request of the mobile terminal for the telematics box. The registration information is used to indicate a correspondence between the user identifier and the identifier of the vehicle. In this implementation, when the mobile terminal registers with the server for the telematics box, the server may determine, based on the created registration information, that the mobile terminal sends the vehicle start instruction to a telematics box of which vehicle.

According to a second aspect, an embodiment of this application further provides a method for starting a vehicle. The method includes: A mobile terminal receives, through a secure transmission protocol or a secure transmission channel, indication information and security information that are of the vehicle and that are sent by a server. The indication information is used to identify at least the vehicle. The mobile terminal correspondingly records the indication information and the security information. The security information is used to verify a vehicle start instruction sent by the mobile terminal to the telematics box. It can be learned that the security information recorded by the mobile terminal is protected by an internet protocol in a process of transmitting the security information from the server to the mobile terminal, thereby avoiding leakage of the security information and reducing a risk that the vehicle is maliciously started by an unauthorized user.

With reference to the second aspect, in a first possible implementation of the second aspect, the method further includes: The mobile terminal sends the vehicle start instruction to the server, and receives a verification result returned by the server. The vehicle start instruction carries the indication information and verification information that is obtained based on the security information. In this implementation, the vehicle start instruction sent by the mobile terminal to the telematics box may be transmitted by using the server, and the server transmits the vehicle start instruction to the telematics box. In this way, a communication process between the mobile terminal and the vehicle may not be restricted by a distance between the terminal and the vehicle.

With reference to the second aspect, in a second possible implementation of the second aspect, the security information is a key, the vehicle start instruction further carries a random number, and the verification information is obtained based on the security information and the random number. In this implementation, the verification information is generated based on the random number and the security information, so that even if the verification information used to verify the vehicle start instruction is maliciously stolen, the security information stored between the mobile terminal and the telematics box is not leaked. In this way, security of storing the security information in the mobile terminal and the telematics box is improved.

With reference to the second aspect, in a third possible implementation of the second aspect, the method further includes: The mobile terminal sends a registration request to the server, so that the server creates registration information and sends the indication information and the security information. The registration information is used to indicate a correspondence between the user identifier and an identifier of the vehicle. In this implementation, when the mobile terminal registers with the server for the telematics box, the server may determine, based on the created registration information, that the mobile terminal sends the vehicle start instruction to a telematics box of which vehicle.

According to a third aspect, an embodiment of this application further provides a method for starting a vehicle. The method includes: A telematics box receives, through a secure transmission protocol or a secure transmission channel, security information of the vehicle and a user identifier of a mobile terminal that are sent by a server. The telematics box correspondingly records the user identifier and the security information. The security information is used to verify a vehicle start instruction sent by the mobile terminal to the telematics box. It can be learned that the security information recorded by the telematics box is protected by an internet protocol in a process of transmitting the security information from the server to the telematics box, thereby avoiding leakage of the security information and reducing a risk that the vehicle is maliciously started by an unauthorized user.

With reference to the third aspect, in a first possible implementation of the third aspect, the method further includes: The telematics box receives the vehicle start instruction sent by the server. The vehicle start instruction carries the user identifier and verification information that is obtained based on the security information. The telematics box obtains the security information based on the user identifier, and verifies the verification information based on the security information, to obtain a verification result. The telematics box sends the verification result to the mobile terminal by using the server. In this implementation, the server transmits the vehicle start instruction sent by the mobile terminal to the telematics box. In this way, a communication process between the mobile terminal and the vehicle may not be restricted by a distance between the terminal and the vehicle.

With reference to the third aspect, in a second possible implementation of the third aspect, the security information is a key, the vehicle start instruction further carries a random number, and the verification information is obtained based on the security information and the random number. That the telematics box verifies the verification information based on the security information, to obtain a verification result is specifically: The telematics box verifies the verification information based on the security information and the random number, to obtain the verification result. In this implementation, the verification information is generated based on the random number and the security information, so that even if the verification information used to verify the vehicle start instruction is maliciously stolen, the security information stored between the mobile terminal and the telematics box is not leaked. In this way, security of storing the security information in the mobile terminal and the telematics box is improved.

According to a fourth aspect, an embodiment of this application further provides an apparatus for starting a vehicle. The apparatus is used in a server, and the apparatus includes: a security information obtaining module, configured to obtain first security information and second security information that are of the vehicle, where the first security information and the second security information are used to verify a vehicle start instruction sent by a mobile terminal to a telematics box; and a first sending module, configured to: send the first security information and indication information of the vehicle to the mobile terminal through a secure transmission protocol or a secure transmission channel, and send the second security information and a user identifier of the mobile terminal to the telematics box of the vehicle, where the indication information is used to identify the vehicle.

With reference to the fourth aspect, in a first possible implementation of the fourth aspect, the apparatus further includes: a first receiving module, configured to receive a first vehicle start instruction sent by the mobile terminal, where the first vehicle start instruction carries the indication information and first verification information that is obtained based on the first security information; a second sending module, configured to send a second vehicle start instruction to the telematics box based on the indication information, where the second vehicle start instruction carries the user identifier and second verification information that is obtained based on the second security information; and a second receiving module, configured to receive a first verification result obtained after the telematics box verifies the second verification information, and send the first verification result to the mobile terminal.

With reference to the first possible implementation of the fourth aspect, in a second possible implementation of the fourth aspect, the first security information and the second security information are same security information, and the first verification information and the second verification information are same verification information.

With reference to the first possible implementation of the fourth aspect, in a third possible implementation of the fourth aspect, the first security information and the second security information are different security information, and the first verification information and the second verification information are different verification information. The second sending module includes: a first obtaining unit, configured to obtain the first security information based on the indication information; a verification unit, configured to verify the first verification information based on the first security information; a second obtaining unit, configured to: if the verification on the first verification information succeeds, obtain the second security information based on the user identifier; a generation unit, configured to generate the second verification information based on the second security information; and a sending unit, configured to send, to the telematics box based on an identifier of the vehicle, the second vehicle start instruction that carries the second verification information.

With reference to any one of the first possible implementation to the third possible implementation of the fourth aspect, in a fourth possible implementation of the fourth aspect, both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number.

With reference to the fourth possible implementation of the fourth aspect, in a fifth possible implementation of the fourth aspect, the first security information is generated based on a first root key, the user identifier, and the identifier of the vehicle; and the second security information is generated based on a second root key, the user identifier, and the identifier of the vehicle.

With reference to any one of the first possible implementation to the fifth possible implementation of the fourth aspect, in a sixth possible implementation of the fourth aspect, the security information obtaining module is specifically configured to generate the first security information and the second security information if a second verification result sent by the telematics box to the mobile terminal is received and the second verification result indicates that the verification succeeds. Alternatively, the security information obtaining module is specifically configured to generate the first security information and the second security information in response to a registration request of the mobile terminal for the telematics box.

With reference to the sixth possible implementation of the fourth aspect, in a seventh possible implementation of the fourth aspect, the apparatus further includes: a creation module, configured to create registration information in response to the registration request of the mobile terminal for the telematics box, where the registration information is used to indicate a correspondence between the user identifier and the identifier of the vehicle.

The apparatus for starting the vehicle provided in the fourth aspect corresponds to the method for starting the vehicle provided in the first aspect. Therefore, for various possible implementations of the apparatus for starting the vehicle provided in the fourth aspect, refer to the various possible implementations of the method for starting the vehicle provided in the first aspect.

According to a fifth aspect, an embodiment of this application further provides an apparatus for starting a vehicle. The apparatus is used in a mobile terminal, and the apparatus includes: a first receiving module, configured to receive, through a secure transmission protocol or a secure transmission channel, indication information and security information that are of the vehicle and that are sent by a server, where the indication information is used to identify at least the vehicle; and a recording module, configured to correspondingly record the indication information and the security information, where the security information is used to verify a vehicle start instruction sent by the mobile terminal to the telematics box.

With reference to the fifth aspect, in a first possible implementation of the fifth aspect, the apparatus further includes: a first sending module, configured to send the vehicle start instruction to the server; and a second receiving module, configured to receive a verification result returned by the server, where the vehicle start instruction carries the indication information and verification information that is obtained based on the security information.

With reference to the fifth aspect, in a second possible implementation of the fifth aspect, the security information is a key, the vehicle start instruction further carries a random number, and the verification information is obtained based on the security information and the random number.

With reference to the fifth aspect, in a third possible implementation of the fifth aspect, the apparatus further includes: a second sending module, configured to send a registration request to the server, so that the server creates registration information and sends the indication information and the security information, where the registration information is used to indicate a correspondence between the user identifier and an identifier of the vehicle.

The apparatus for starting the vehicle provided in the fifth aspect corresponds to the method for starting the vehicle provided in the second aspect. Therefore, for various possible implementations of the apparatus for starting the vehicle provided in the fifth aspect, refer to the various possible implementations of the method for starting the vehicle provided in the second aspect.

According to a sixth aspect, an embodiment of this application further provides an apparatus for starting a vehicle. The apparatus is used in a telematics box, and the apparatus includes: a first receiving module, configured to receive, through a secure transmission protocol or a secure transmission channel, security information of the vehicle and a user identifier of a mobile terminal that are sent by a server; and a recording module, configured to correspondingly record the user identifier and the security information, where the security information is used to verify the vehicle start instruction sent by the mobile terminal to the telematics box.

With reference to the sixth aspect, in a first possible implementation of the sixth aspect, the apparatus further includes: a second receiving module, configured to receive the vehicle start instruction sent by the server, where the vehicle start instruction carries the user identifier and verification information that is obtained based on the security information; an obtaining module, configured to obtain the security information based on the user identifier; a verification module, configured to verify the verification information based on the security information, to obtain a verification result; and a sending module, configured to send the verification result to the mobile terminal by using the server.

With reference to the sixth aspect, in a second possible implementation of the sixth aspect, the security information is a key, the vehicle start instruction further carries a random number, and the verification information is obtained based on the security information and the random number. The verification module is specifically configured to verify the verification information based on the security information and the random number, to obtain the verification result.

The apparatus for starting the vehicle provided in the sixth aspect corresponds to the method for starting the vehicle provided in the third aspect. Therefore, for various possible implementations of the apparatus for starting the vehicle provided in the sixth aspect, refer to the various possible implementations of the method for starting the vehicle provided in the third aspect.

According to a seventh aspect, an embodiment of this application further provides a method for starting a vehicle. The method includes: A first server obtains first security information and second security information that are of the vehicle. The first security information and the second security information are used to verify a vehicle start instruction sent by a mobile terminal to a telematics box. The first server sends the first security information and an identifier of the vehicle to a second server through a secure transmission protocol or a secure transmission channel, and sends the second security information and a user identifier of the mobile terminal to the telematics box of the vehicle. The identifier of the vehicle is used to indicate the second server to send the first security information and indication information to the mobile terminal, and the indication information is used to identify the vehicle. It can be learned that the first server may send the generated first security information and the generated second security information to the second server and the telematics box respectively, so that the vehicle start instruction sent by the mobile terminal to the telematics box can be verified by using the first security information and the second security information. In this way, when the verification succeeds, the telematics box controls the vehicle to start. In this way, when security information, for example, a key is transmitted from the server to the mobile terminal and the telematics box, the security information may be protected by an internet protocol, thereby avoiding the security information from being transparently transmitted, avoiding leakage of the security information, and reducing a risk that the vehicle is maliciously started. In addition, even if the vehicle is relatively far away from the mobile terminal, the telematics box and the mobile terminal can still obtain the security information sent by the server. Therefore, a transmission process of the security information may not be restricted by a distance between the vehicle and the mobile terminal.

With reference to the seventh aspect, in a first possible implementation of the seventh aspect, the method further includes: The first server receives a first vehicle start instruction sent by the second server. The first vehicle start instruction carries the identifier of the vehicle and first verification information that is obtained based on the first security information. The first server sends a second vehicle start instruction to the telematics box based on the identifier of the vehicle. The second vehicle start instruction carries the user identifier and second verification information that is obtained based on the second security information. The first server receives a first verification result obtained after the telematics box verifies the second verification information, and sends the first verification result to the second server. In this implementation, the vehicle start instruction sent by the mobile terminal to the telematics box may be transmitted by using the first server and the second server, and the first server transmits the vehicle start instruction to the telematics box. In this way, a communication process between the mobile terminal and the vehicle may not be restricted by a distance between the terminal and the vehicle.

With reference to the first possible implementation of the seventh aspect, in a second possible implementation of the seventh aspect, the first security information and the second security information are same security information, and the first verification information and the second verification information are same verification information. In this implementation, if the security information and the verification information that are delivered by the first server to the mobile terminal are the same as the security information and the verification information that are delivered by the server to the telematics box, the telematics box and the mobile terminal may verify the vehicle start instruction based on the same security information and the same verification information.

With reference to the first possible implementation of the seventh aspect, in a third possible implementation of the seventh aspect, the first security information and the second security information are different security information, and the first verification information and the second verification information are different verification information. That the first server sends the second vehicle start instruction to the telematics box based on the identifier of the vehicle includes: The first server obtains the first security information based on the identifier of the vehicle, and verifies the first verification information based on the first security information. If the verification on the first verification information succeeds, the first server obtains the second security information based on the user identifier, and generates second verification information based on the second security information. The first server sends, to the telematics box based on the identifier of the vehicle, the second vehicle start instruction that carries the second verification information. In this implementation, the first server verifies, by using the first verification information, the first vehicle start instruction sent by the mobile terminal, that is, verifies the mobile terminal, and sends the generated second vehicle start instruction to the telematics box, so that the telematics box verifies the second vehicle start instruction based on the second verification information. In this way, verification is performed twice in a process in which the mobile terminal starts the vehicle, thereby improving security of starting the vehicle.

With reference to any one of the first possible implementation to the third possible implementation of the seventh aspect, in a fourth possible implementation of the seventh aspect, both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number. In this implementation, the verification information is generated based on the random number and the security information, so that even if the verification information used to verify the vehicle start instruction is maliciously stolen, the security information stored between the mobile terminal and the telematics box is not leaked. In this way, security of storing the security information in the mobile terminal and the telematics box is improved.

With reference to the fourth possible implementation of the seventh aspect, in a fifth possible implementation of the seventh aspect, the first security information is generated based on a first root key, the user identifier, and the identifier of the vehicle; and the second security information is generated based on a second root key, the user identifier, and the identifier of the vehicle. In this implementation, the root key, the user identifier, and the identifier of the vehicle are used to generate the security information, so that even if the security information is maliciously stolen, the root key on the server is not leaked. Therefore, the server may continue to generate security information for more mobile terminals and telematics boxes based on the root key.

With reference to any one of the first possible implementation to the fifth possible implementation of the seventh aspect, in a sixth possible implementation of the seventh aspect, that the first server generates first security information and second security information is specifically: The first server generates the first security information and the second security information if a second verification result sent by the telematics box to the mobile terminal is received and the second verification result indicates that the verification succeeds. Alternatively, the first server generates the first security information and the second security information in response to a registration request of the mobile terminal for the telematics box. In this implementation, after the mobile terminal successfully starts the vehicle, the server updates the security information of the mobile terminal and the telematics box, so that the security information stored in the mobile terminal and the telematics box is not unchangeable, thereby improving security of starting the vehicle. In addition, when the mobile terminal registers with the telematics box, the server generates the security information for the mobile terminal and the telematics box, so that the registered telematics box and the registered mobile terminal can obtain the security information used to verify the vehicle start instruction, and the mobile terminal starts the vehicle based on the security information.

According to an eighth aspect, an embodiment of this application further provides an apparatus for starting a vehicle. The apparatus includes: a security information obtaining module, configured to obtain first security information and second security information that are of the vehicle, where the first security information and the second security information are used to verify a vehicle start instruction sent by a mobile terminal to a telematics box; and a first sending module, configured to send the first security information and an identifier of the vehicle to a second server through a secure transmission protocol or a secure transmission channel, and send the second security information and a user identifier of the mobile terminal to the telematics box of the vehicle, where the identifier of the vehicle is used to indicate the second server to send the first security information and indication information to the mobile terminal, and the indication information is used to identify the vehicle.

With reference to the eighth aspect, in a first possible implementation of the eighth aspect, the apparatus further includes: a first receiving module, configured to receive a first vehicle start instruction sent by the second server, where the first vehicle start instruction carries the identifier of the vehicle and first verification information that is obtained based on the first security information; a second sending module, configured to send the second vehicle start instruction to the telematics box based on the identifier of the vehicle, where the second vehicle start instruction carries the user identifier and second verification information that is obtained based on the second security information; and a second receiving module, configured to receive a first verification result obtained after the telematics box verifies the second verification information, and send the first verification result to the second server.

With reference to the first possible implementation of the eighth aspect, in a second possible implementation of the eighth aspect, the first security information and the second security information are same security information, and the first verification information and the second verification information are same verification information.

With reference to the first possible implementation of the eighth aspect, in a third possible implementation of the eighth aspect, the first security information and the second security information are different security information, and the first verification information and the second verification information are different verification information. The second sending module includes: a first obtaining unit, configured to obtain the first security information based on the identifier of the vehicle; a verification unit, configured to verify the first verification information based on the first security information; a first obtaining unit, configured to: if the verification on the first verification information succeeds, obtain the second security information based on the user identifier; a generation unit, configured to generate the second verification information based on the second security information; and a sending unit, configured to send, to the telematics box based on the identifier of the vehicle, the second vehicle start instruction that carries the second verification information.

With reference to any one of the first possible implementation to the third possible implementation of the eighth aspect, in a fourth possible implementation of the eighth aspect, both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number.

With reference to the fourth possible implementation of the eighth aspect, in a fifth possible implementation of the eighth aspect, the first security information is generated based on a first root key, the user identifier, and the identifier of the vehicle; and the second security information is generated based on a second root key, the user identifier, and the identifier of the vehicle.

With reference to any one of the first possible implementation to the fifth possible implementation of the eighth aspect, in a sixth possible implementation of the eighth aspect, the security information obtaining module is specifically configured to generate the first security information and the second security information if a second verification result sent by the telematics box to the mobile terminal is received and the second verification result indicates that the verification succeeds. Alternatively, the security information obtaining module is specifically configured to generate the first security information and the second security information in response to a registration request of the mobile terminal for the telematics box.

The apparatus for starting the vehicle provided in the eighth aspect corresponds to the method for starting the vehicle provided in the seventh aspect. Therefore, for various possible implementations of the apparatus for starting the vehicle provided in the eighth aspect, refer to the various possible implementations of the method for starting the vehicle provided in the seventh aspect.

According to a ninth aspect, an embodiment of this application further provides a device for starting a vehicle. The device is used in a server, and the device includes a memory and a processor. The memory is configured to: store program code, and transmit the program code to the processor. The processor is configured to perform, according to instructions in the program code, the method for starting the vehicle in the first aspect.

The device for starting the vehicle provided in the ninth aspect corresponds to the method for starting the vehicle provided in the first aspect. Therefore, for various possible implementations of the device for starting the vehicle provided in the ninth aspect, refer to the various possible implementations of the method for starting the vehicle provided in the first aspect.

According to a tenth aspect, an embodiment of this application further provides a device for starting a vehicle. The device is used in a mobile terminal, and the device includes a memory and a processor. The memory is configured to: store program code, and transmit the program code to the processor. The processor is configured to perform, according to instructions in the program code, the method for starting the vehicle in the second aspect.

The device for starting the vehicle provided in the tenth aspect corresponds to the method for starting the vehicle provided in the second aspect. Therefore, for various possible implementations of the device for starting the vehicle provided in the tenth aspect, refer to the various possible implementations of the method for starting the vehicle provided in the second aspect.

According to an eleventh aspect, an embodiment of this application further provides a device for starting a vehicle. The device is used in a telematics box, and the device includes a memory and a processor. The memory is configured to: store program code, and transmit the program code to the processor. The processor is configured to perform, according to instructions in the program code, the method for starting the vehicle in the third aspect.

The device for starting the vehicle provided in the eleventh aspect corresponds to the method for starting the vehicle provided in the third aspect. Therefore, for various possible implementations of the device for starting the vehicle provided in the eleventh aspect, refer to the various possible implementations of the method for starting the vehicle provided in the third aspect.

According to a twelfth aspect, an embodiment of this application further provides a device for starting a vehicle. The device is used in a first server, and the device includes a memory and a processor. The memory is configured to: store program code, and transmit the program code to the processor. The processor is configured to perform, according to instructions in the program code, the method for starting the vehicle in the seventh aspect.

The device for starting the vehicle provided in the twelfth aspect corresponds to the method for starting the vehicle provided in the seventh aspect. Therefore, for various possible implementations of the device for starting the vehicle provided in the twelfth aspect, refer to the various possible implementations of the method for starting the vehicle provided in the seventh aspect.

According to a thirteenth aspect, an embodiment of this application further provides a computer-readable storage medium. The computer-readable storage medium stores instructions, and when the instructions are run on a computer or a processor, the computer or the processor is enabled to perform method for starting the vehicle according to the first aspect, perform the method for starting the vehicle according to the second aspect, perform the method for starting the vehicle according to the third aspect, or perform the method for starting the vehicle according to the seventh aspect.

According to a fourteenth aspect, an embodiment of this application further provides a computer program product including instructions. When the computer program product runs on a computer or a processor, the computer or the processor is enabled to perform the method for starting the vehicle according to the first aspect, perform the method for starting the vehicle according to the second aspect, perform the method for starting the vehicle according to the third aspect, or perform the method for starting the vehicle according to the seventh aspect.

In this embodiment of this application, the server may send the generated first security information and the generated second security information to the mobile terminal and the telematics box respectively, so that the mobile terminal and the telematics box verify, based on the first security information and the second security information, the vehicle start instruction sent by the mobile terminal to the telematics box. In this way, when encryption information is transmitted from the server to the mobile terminal and the telematics box, the encryption information may be protected by an internet protocol, thereby avoiding the encryption information from being transparently transmitted, avoiding leakage of the encryption information, and reducing a risk that the vehicle is maliciously started. In addition, even if the vehicle is relatively far away from the mobile terminal, the telematics box and the mobile terminal can still obtain the encryption information sent by the server. Therefore, the transmission process of the encryption information may not be restricted by the distance between the vehicle and the mobile terminal.

DESCRIPTION OF EMBODIMENTS

Figure 1:
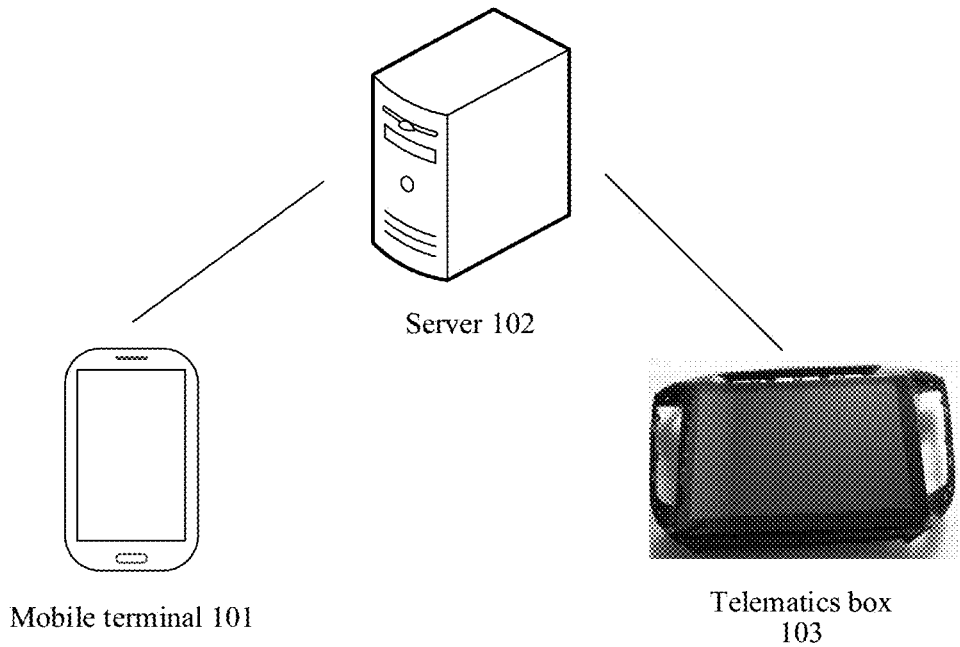
FIG. 1 is a schematic diagram of an application scenario according to an embodiment of this application.

Researches show that, to improve security of starting a vehicle by a mobile terminal, each time after the mobile terminal starts the vehicle by using a key, a telematics box usually sends, to the mobile terminal through NFC (near field communication) or by using a Bluetooth technology, security information (such as a key) required for starting the vehicle next time, so as to update the security information on the mobile terminal. However, updated security information is transparently transmitted by the telematics box to the mobile terminal through NFC or by using the Bluetooth technology. This causes a risk of leaking the security information. Once the security information is leaked, the vehicle may be maliciously started by an unauthorized user. In addition, the security information can be transmitted between the vehicle and the mobile terminal only through near field communication, and the security information cannot be transmitted when the vehicle is far away from the mobile terminal.

Based on this, in the embodiments of this application, a server delivers, to the mobile terminal and the telematics box, the security information used for authentication, to avoid leakage of the security information and reduce a risk that the vehicle is maliciously started. Specifically, the server may send first security information and second security information to the mobile terminal and the telematics box respectively, so that a vehicle start instruction sent by the mobile terminal to the telematics box can be verified by using the first security information and the second security information. In this way, when the verification succeeds, the telematics box controls the vehicle to start. When the security information such as the key is transmitted from the server to the mobile terminal and the telematics box, the server transmits the security information through secure transmission channels between the server and the mobile terminal and the telematics box, or transmits the security information through a secure transmission protocol between the server and the mobile terminal and the telematics box. This can avoid the security information from being transparently transmitted, and further avoid leakage of the security information to reduce a risk that the vehicle is maliciously started. In addition, even if the vehicle is relatively far away from the mobile terminal, the telematics box and the mobile terminal can still obtain encryption information sent by the server. Therefore, a transmission process of the encryption information may not be restricted by a distance between the vehicle and the mobile terminal. It should be noted that the first security information and the second security information may be generated by the server, or may be obtained by the server from a security information generation apparatus. The secure transmission channel between the server and the mobile terminal and the secure transmission channel between the server and the telematics box each may specifically be a transmission channel established according to a protocol such as an IPsec (Internet Protocol Security) protocol, a TLS (Transport Layer Security) protocol, and a DTLS (Datagram Transport Layer Security) protocol. The secure transmission protocol may specifically be an HTTPS (HyperText Transfer Protocol Secure) protocol or the like. In addition, even if the vehicle is relatively far away from the mobile terminal, the telematics box and the mobile terminal can still obtain the security information sent by the server. Therefore, the transmission process of the security information may not be restricted by the distance between the vehicle and the mobile terminal.

In an example, an embodiment of this application may be applied to an example application scenario shown in FIG. 1. In this scenario, a server 102 may generate or obtain, from a security information generation apparatus, first security information and second security information such as a key, and send the first security information to a mobile terminal 101 according to an HTTPS protocol. The server 102 may further send, to the mobile terminal 101 according to the HTTP protocol, indication information used to identify a vehicle, so as to determine, based on the indication information, a telematics box 103 that receives a vehicle start instruction sent by the mobile terminal 101. In addition, the server 102 may further send the second security information and a user identifier of the mobile terminal 101 to the telematics box 103 according to the HTTP protocol. The mobile terminal 101 may generate the vehicle start instruction based on the received first security information and the received indication information, and send the vehicle start instruction to the telematics box 103. The telematics box 103 may determine, according to the received vehicle start instruction, the second security information corresponding to the user identifier of the mobile terminal 101, and verify the vehicle start instruction based on the second security information. If the verification succeeds, the vehicle is allowed to be started. Otherwise, if the verification fails, the vehicle is rejected to be started.

It may be understood that the foregoing scenario is merely an example scenario provided in this embodiment of this application, and application of this embodiment of this application is not limited to the foregoing example scenario.

The following further describes a specific implementation of starting a vehicle with reference to the accompanying drawings.

Figure 2:
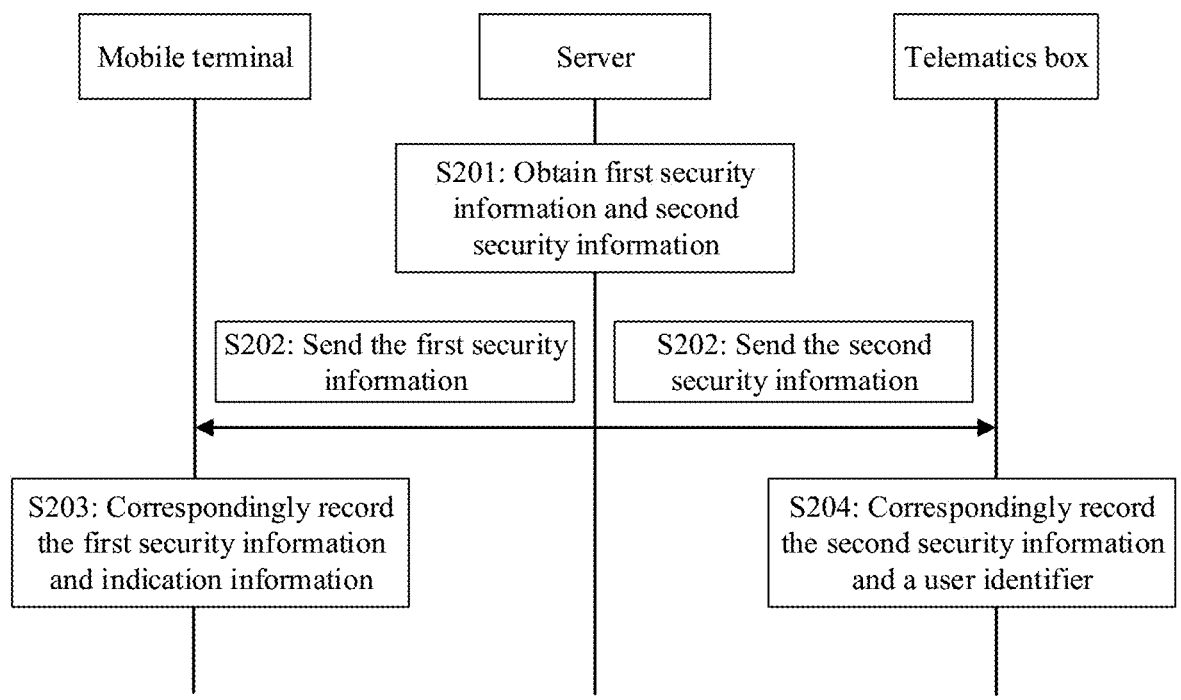
FIG. 2 is a schematic diagram of signaling interaction of a method for starting a vehicle according to an embodiment of this application.

FIG. 2 is a schematic diagram of signaling interaction of a method for starting a vehicle according to an embodiment of this application. The method may specifically include the following steps.

S201: A server obtains first security information and second security information that are of a vehicle, where the first security information and the second security information are used to verify a vehicle start instruction sent by a mobile terminal to a telematics box.

In actual application, if the mobile terminal needs to start the vehicle by using a virtual vehicle key, the mobile terminal usually generates a corresponding vehicle start instruction, and sends the vehicle start instruction to the telematics box, to trigger the vehicle to start. In consideration of security of the vehicle, after receiving the vehicle start instruction sent by the mobile terminal, the telematics box usually verifies the vehicle start instruction by using security information such as a key, and the telematics box allows to start the vehicle only when the verification on the vehicle start instruction succeeds.

Based on this, in this embodiment, the security information that is obtained by the server and that is required for verifying the vehicle start instruction includes the first security information sent to the mobile terminal and the second security information sent to the telematics box. In an example, both the first security information and the second security information that are generated by the server may specifically be keys. In other words, in some implementations, the vehicle start instruction may be verified by using the two keys generated by the server. Certainly, in another possible implementation, the first security information and the second security information that are generated by the server for the mobile terminal and the telematics box respectively may alternatively be digital certificates or the like.

In this embodiment, the server itself may generate required security information, to obtain the security information. Alternatively, the server may obtain security information from the security information generation apparatus after the security information generation apparatus generates the security information.

Further, when both the first security information and the second security information that are obtained by the server are specifically keys, the server may specifically generate the first security information based on a first root key, a user identifier of the mobile terminal, and an identifier of the vehicle; and generate the second security information based on a second root key, the user identifier of the mobile terminal, and the identifier of the vehicle. It may be understood that the server or the security information generation apparatus generates the security information based on the root key, so that even if the security information is leaked due to a malicious attack, the root key cannot be obtained by an attacker, thereby improving security of the root key. In this way, the server or the security information generation apparatus may continue to use the root key to generate corresponding security information for different mobile terminals.

In an example, when the mobile terminal registers with the server for the telematics box, the server may respond to a registration request sent by the mobile terminal, and generate corresponding first security information and corresponding second security information for the mobile terminal and the telematics box respectively.

In actual application, before a user uses the mobile terminal to start the vehicle for the first time, registration with the telematics box may be usually completed on the server in advance. In specific implementation, the mobile terminal may send the registration request for the telematics box to the server. The registration request carries the user identifier of the mobile terminal and the indication information used to identify the vehicle. The server may respond to the registration request, perform validity verification on the user based on the user identifier carried in the request, and create registration information on the server based on the user identifier and the indication information after the verification succeeds. The registration information is used to indicate a correspondence between the user identifier of the mobile terminal and the identifier of the vehicle. Certainly, in another possible implementation, the registration request sent by the mobile terminal to the server may not include the user identifier and the indication information. The server responds to the registration request, and obtains the user identifier and the indication information from the mobile terminal, thereby completing validity verification of the user and creation of the registration information. In this way, based on the user identifier of the mobile terminal, the server may determine, by querying the registration information, a vehicle identifier corresponding to the user identifier of the mobile terminal, that is, determine a vehicle to be started by the mobile terminal.

In some examples, the vehicle identifier may specifically be one of a license plate number of the vehicle, a vehicle VIN (Vehicle Identification Number), or the like. The indication information may specifically be the vehicle identifier, or may be information different from the vehicle identifier. For example, when the indication information is information different from the vehicle identifier, the indication information may specifically be the license plate number, and the vehicle identifier is specifically the vehicle VIN. The server may determine the vehicle VIN based on the license plate number of the vehicle.

In an actual application scenario, if the vehicle identifier is specifically the vehicle VIN, in consideration of security of vehicle information, the vehicle VIN may not be presented to the user on the mobile terminal. Therefore, when creating the registration information, the server may create a correspondence between the user identifier of the mobile terminal, the license plate number, and the vehicle VIN. In this way, when the mobile terminal provides the license plate number to the server, the server may determine, based on the registration information, the user identifier and the vehicle VIN that are corresponding to the license plate number.

It should be noted that, the server may perform a registration information creation process while generating the security information, or may perform a registration information creation process before generating the security information, or may perform a registration information creation process after generating the security information.

In addition to generating the corresponding security information for the mobile terminal and the telematics box when the mobile terminal performs the registration request, in another example implementation, the server may further generate security information for the mobile terminal and the telematics box after the mobile terminal successfully starts the vehicle, that is, update the security information delivered to the mobile terminal and the telematics box after the mobile terminal successfully starts the vehicle. This can further improve security of starting the vehicle by the mobile terminal by using the security information.

S202: The server sends the first security information and the indication information of the vehicle to the mobile terminal through a secure transmission protocol or a secure transmission channel, and sends the second security information and the user identifier of the mobile terminal to the telematics box, where the indication information is used to identify the vehicle.

In this embodiment, for the first security information generated by the server, the server may send the first security information to the mobile terminal through the secure transmission protocol or the secure transmission channel. It may be understood that, in a process of transmitting the first security information from the server to the mobile terminal, the first security information is protected by the secure transmission protocol or the secure transmission channel. This can avoid leakage of the first security information caused by transparent transmission. For example, the secure transfer protocol may specifically include an application layer protocol, for example, an HTTPS protocol or an HTTP (HyperText Transfer Protocol) protocol based on secure channel transmission.

In actual application, the user may have several vehicles, so that a same mobile terminal used by the user may start the several different vehicles. However, when telematics boxes of the different vehicles verify different vehicle start instructions sent by the mobile terminal, different security information is usually required. Therefore, when sending the first security information to the mobile terminal by using an internet protocol, the server further needs to send the indication information corresponding to the first security information to the mobile terminal. In this way, the mobile terminal determines, based on the indication information, the first security information corresponding to the telematics box, so as to verify the vehicle start instruction by using the first security information. The indication information is used to identify the vehicle.

Similarly, when sending the second security information to the telematics box through the secure transmission channel or the secure transmission protocol, the server may also send the user identifier of the mobile terminal corresponding to the second security information to the telematics box. In this way, the telematics box may distinguish, based on user identifiers of different mobile terminals, the mobile terminal that sends the vehicle start instruction, and complete verification on the vehicle start instruction by using the second security information corresponding to the user identifier.

In addition, the server may further correspondingly store the first security information and the indication information that are sent to the mobile terminal, and correspondingly store the second security information and the user identifier of the mobile terminal that are sent to the telematics box.

S203: The mobile terminal correspondingly records the received first security information and the received indication information.

S204: The telematics box correspondingly records the received second security information and the received user identifier of the mobile terminal.

In this embodiment, the mobile terminal may receive, by using the internet protocol, the first security information and the indication information that are sent by the server, and record the first security information and the indication information in the mobile terminal. In addition, the telematics box may also receive, by using the internet protocol, the second security information and the user identifier of the mobile terminal that are sent by the server, and correspondingly record the second security information and the user identifier in the telematics box. In this way, when the mobile terminal needs to start the vehicle, the mobile terminal may generate the vehicle start instruction based on the first security information, and send the vehicle start instruction to the telematics box, so that the telematics box verifies the vehicle start instruction based on the second security information recorded by the telematics box, to determine whether the vehicle is allowed to be started.

It should be noted that in this embodiment, step S203 and step S204 are only used to respectively identify two processes in which the mobile terminal records the data and the telematics box records the data. An execution sequence of step S203 and step S204 is not limited.

It can be learned that both the first security information and the second security information that are used to verify the vehicle start instruction are transmitted by using the internet protocol, and are protected by the internet protocol. This can avoid leakage caused by transparent transmission, and reduce a risk that the vehicle is maliciously started by an unauthorized user.

Figure 3:
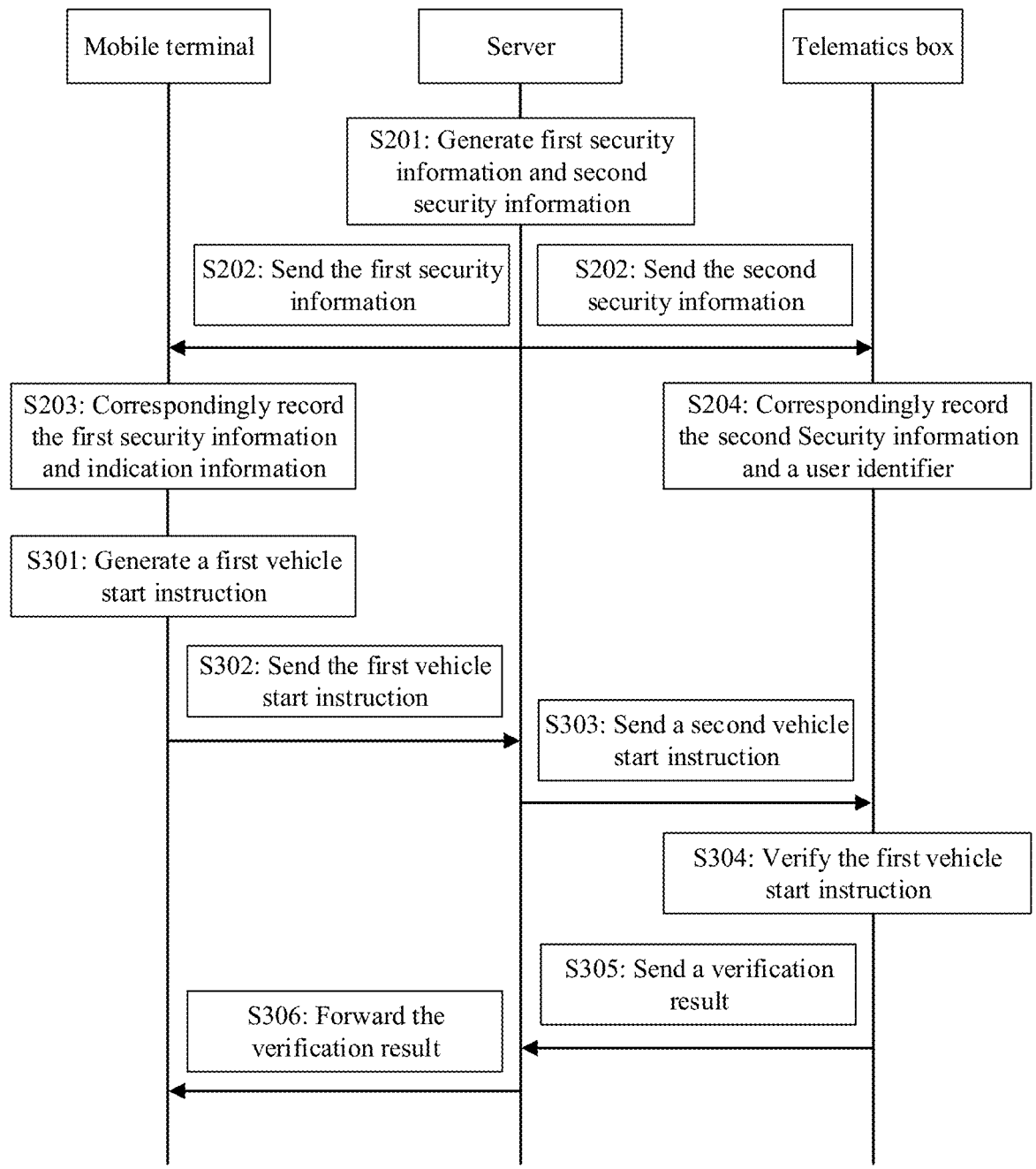
FIG. 3 is a schematic diagram of signaling interaction of still another method for starting a vehicle according to an embodiment of this application.

Based on the foregoing embodiment, in a further possible implementation, the mobile terminal collaborates with the telematics box to complete a process of verifying the vehicle start instruction by using the first security information and the second security information. Details may be shown in FIG. 3. FIG. 3 is a schematic diagram of signaling interaction of a method for starting a vehicle according to an embodiment of this application. The method includes the following steps.

S301: A mobile terminal generates a first vehicle start instruction, where the first vehicle start instruction carries indication information and first verification information that is obtained based on first security information.

In this embodiment, if the mobile terminal determines that a vehicle needs to be started, the mobile terminal may generate a first vehicle start instruction based on corresponding recorded indication information and corresponding first security information. In an example implementation, the mobile terminal may first generate the first verification information based on the first security information, and then generate, based on the obtained first verification information and the obtained indication information, the first vehicle start instruction used to trigger the vehicle to start. In an example, the indication information may indicate a user identifier and a vehicle identifier.

For example, the first security information recorded by the mobile terminal may specifically be a key I, and the indication information may include a user identifier id_user and a license plate number id_car. The mobile terminal may generate a random number R, generate first verification information MAC (R, I) based on the key I and the random number R, and further generate a first vehicle start instruction based on MAC (R, I), id_user, and id_car. The generated first vehicle start instruction carries MAC (R, I), id_user, and id_car information. The mobile terminal generates the first verification information MAC (R, I) by using the random number R, so that randomness of the generated first verification information MAC (R, I) can be improved, and further security of verifying the vehicle start instruction by using the key I can be improved.

It should be noted that, in the foregoing example, the mobile terminal may generate the random number R, and add the random number R to the first vehicle start instruction, so that a telematics box does not need to continuously send, to the mobile terminal, a random number required for verifying the vehicle start instruction, thereby reducing power consumption of the telematics box.

S302: The mobile terminal sends the first vehicle start instruction to a server.

S303: The server sends a second vehicle start instruction to the telematics box based on the vehicle identifier carried in the received first vehicle start instruction, where the second vehicle start instruction carries the user identifier and second verification information obtained based on the second security information.

In specific implementation, the server may position, based on the vehicle identifier carried in the received first vehicle start instruction and by searching for pre-created registration information, a telematics box of the vehicle to be started according to the first vehicle start instruction. After generating the second vehicle start instruction based on the first vehicle start instruction, the generated second vehicle start instruction may be sent to the positioned telematics box. The second vehicle start instruction sent by the server to the telematics box carries the user identifier of the mobile terminal and the second verification information generated based on the second security information.

It should be noted that the first security information and the second security information in this embodiment may be same security information, and correspondingly, the first verification information and the second verification information that are generated based on the same security information may be the same. In this case, the first vehicle start instruction and the second vehicle start instruction may be the same. For example, the server may directly use the first vehicle start instruction as the second vehicle start instruction, and send the second vehicle start instruction to the telematics box.

Certainly, in another implementation, the first vehicle start instruction and the second vehicle start instruction may be different. For example, both the first security information and the second security information are specifically keys I. After the server receives the first vehicle start instruction that is sent by the mobile terminal and that carries the first verification information MAC (R, I), the user identifier id_user, the license plate number id_car, and the random number R, a telematics box to which the second vehicle start instruction needs to be sent may be positioned based on id_car. The first verification information MAC (R, I) in the first vehicle start instruction is used as second verification information MAC (R, I) and is carried in the second vehicle start instruction. At the same time, the server further adds the user identifier id_user and the random number R in the first vehicle start instruction to the second vehicle start instruction, thereby obtaining the second vehicle start instruction different from the first vehicle start instruction.

Certainly, in some other possible implementations, the first security information and the second security information may be different security information, and correspondingly, the first verification information and the second verification information generated based on the different security information may be different. In this case, the first vehicle start instruction and the second vehicle start instruction may be different.

For example, the first security information is a key $I_1$, and the second security information is a key $I_2$. The first vehicle start instruction received by the server carries first verification information $MAC_1$ (R, $I_1$), a user identifier id_user, a license plate number id_car, and a random number R. $MAC_1$ (R, $I_1$) is calculated based on the random number R and the key $I_1$. The server may find, based on id_car in the first vehicle start instruction, first security information $I_1'$ that is stored in the server and that corresponds to id_car, and calculates verification information $MAC_1'$ (R, $I_1'$) based on the first security information $I_1'$ stored in the server and the random number R carried in the first vehicle start instruction. Then, the server may verify $MAC_1$ (R, $I_1$) included in the first vehicle start instruction by using the calculated verification information $MAC_1'$ (R, $I_1'$). Specifically, $MAC_1'$ (R, $I_1'$) may be compared with $MAC_1$ (R, $I_1$). If $MAC_1'$ (R, $I_1'$) is consistent with $MAC_1$ (R, $I_1$), it indicates that the verification on the first verification information in the first vehicle start instruction succeeds. The server may find, based on the user identifier id_user in the first vehicle start instruction, second security information $I_2$ that is stored in the server and that corresponds to the user identifier id_user, generates second verification information $MAC_2$ (R, $I_2$) based on the second security information $I_2$, and then generates, based on the user identifier id_user, the random number R, and the generated $MAC_2$ (R, $I_2$), the second vehicle start instruction sent to the telematics box.

In the foregoing two examples, the server generates the second verification information by using the random number R (namely, the random number R carried in the first vehicle start instruction) provided by the mobile terminal. In some other examples, the server may generate the second verification information by using a random number R' generated by the server. In this case, even if the first security information and the second security information are the same, because the mobile terminal and the server may generate verification information based on different random numbers, the first verification information and the second verification information may be different. Correspondingly, the first vehicle start instruction and the second vehicle start instruction are also different.

For example, the first verification information generated by the server based on the random number R is MAC (R, I), and the second verification information generated based on the random number R' is MAC(R', I). Because the random number R is different from the random number R', the first verification information MAC (R, I) generated by the server is different from the second verification information MAC (R', I) generated by the server. The first vehicle start instruction and the second vehicle start instruction that carry different verification information are also different, and a random number carried in the second vehicle start instruction is R'.

S304: The telematics box verifies the received second vehicle start instruction, to obtain a verification result.

In specific implementation, the telematics box may find, based on the user identifier that is of the mobile terminal that is carried in the second vehicle start instruction, the second security information that is previously recorded and that corresponds to the user identifier, and complete verification on the second vehicle start instruction based on the second security information.

For example, it is assumed that the second security information is specifically a key, and the second vehicle start instruction carries second verification information $MAC_2$ (R, $I_2$), a random number R, and a user identifier id_user. The telematics box may find, based on the user identifier and the second security information that are correspondingly recorded in advance (namely, the user identifier and the second security information that are sent by the server to the telematics box in step S204), a key $I_2'$ corresponding to the user identifier id_user, generate verification information $MAC_2'$ (R, $I_2'$) based on found $I_2'$ and the random number R that is carried in the second vehicle start instruction, and further compare $MAC_2'$ (R, $I_2'$) with $MAC_2$ (R, $I_2$). If $MAC_2'$ (R, $I_2'$) is consistent with $MAC_2$ (R, $I_2$), it indicates that the key $I_2$ is consistent with the key $I_2'$ stored in the telematics box. It may be determined that the verification on the second verification information succeeds, the vehicle is allowed to be started, and a corresponding verification result is obtained. Certainly, if $MAC_2'$ (R, $I_2'$) is inconsistent with $MAC_2$ (R, $I_2$), it may be determined that the verification on the second verification information fails, and a verification result indicating that the verification on the second verification information fails is obtained.

It should be noted that, when the first security information and the second security information are specifically digital certificates delivered by the server to the mobile terminal, the first verification information obtained based on the first security information may specifically be the digital certificate, and similarly, the second verification information obtained based on the second security information is also the digital certificate. In this case, when verifying the second vehicle start instruction, that is, whether the digital certificate on the telematics box is consistent with the received digital certificate is verified. If the digital certificate on the telematics box is consistent with the received digital certificate, it is determined that the verification succeeds. Otherwise, if the digital certificate on the telematics box isn't consistent with the received digital certificate, the verification fails.

S305: The telematics box sends, to the server, the verification result representing that the verification on the second verification information succeeds.

S306: The server forwards the received verification result to the mobile terminal.

In this embodiment, after determining that the verification on the second verification information succeeds, the telematics box may allow the vehicle to start, and feed back the obtained verification result to the mobile terminal by using the server.

In a process of transmitting the first vehicle start instruction, the second vehicle start instruction, and the verification result between the mobile terminal, the server, and the telematics box, transmission may be performed through a secure transmission channel or a secure transmission protocol, or transmission may be performed based on a transmission protocol that does not have an encryption capability.

It should be noted that, in the foregoing embodiment, a process of generating or completing the verification on the first verification information and/or the second verification information based on the random number is merely used as an example for description of an implementation, and is not used to limit a process of generating the verification information or verifying the verification information. For example, in another possible implementation, the verification information MAC and the like may also be directly generated based on only the key I without participation of the random number.

In actual application, to further improve security of starting the vehicle by the mobile terminal by using a virtual vehicle key, the first security information sent to the mobile terminal and the second security information sent to the telematics box may further be updated after the vehicle is started. Specifically, if the server can receive the verification result fed back by the telematics box to the mobile terminal, and the verification result represents that the verification performed by the telematics box on the second vehicle start instruction succeeds, the server may update the first security information and the second security information, send the indication information and updated first security information to the terminal through the secure transmission channel or the secure transmission protocol, and send the user identifier and updated second security information to the telematics box through the secure transmission channel or the secure transmission protocol. In this way, the first security information and the second security information that are required for verifying the vehicle start instruction are not unchangeable, so that a risk of leaking the first security information and the second security information can further be reduced.

Figure 4:
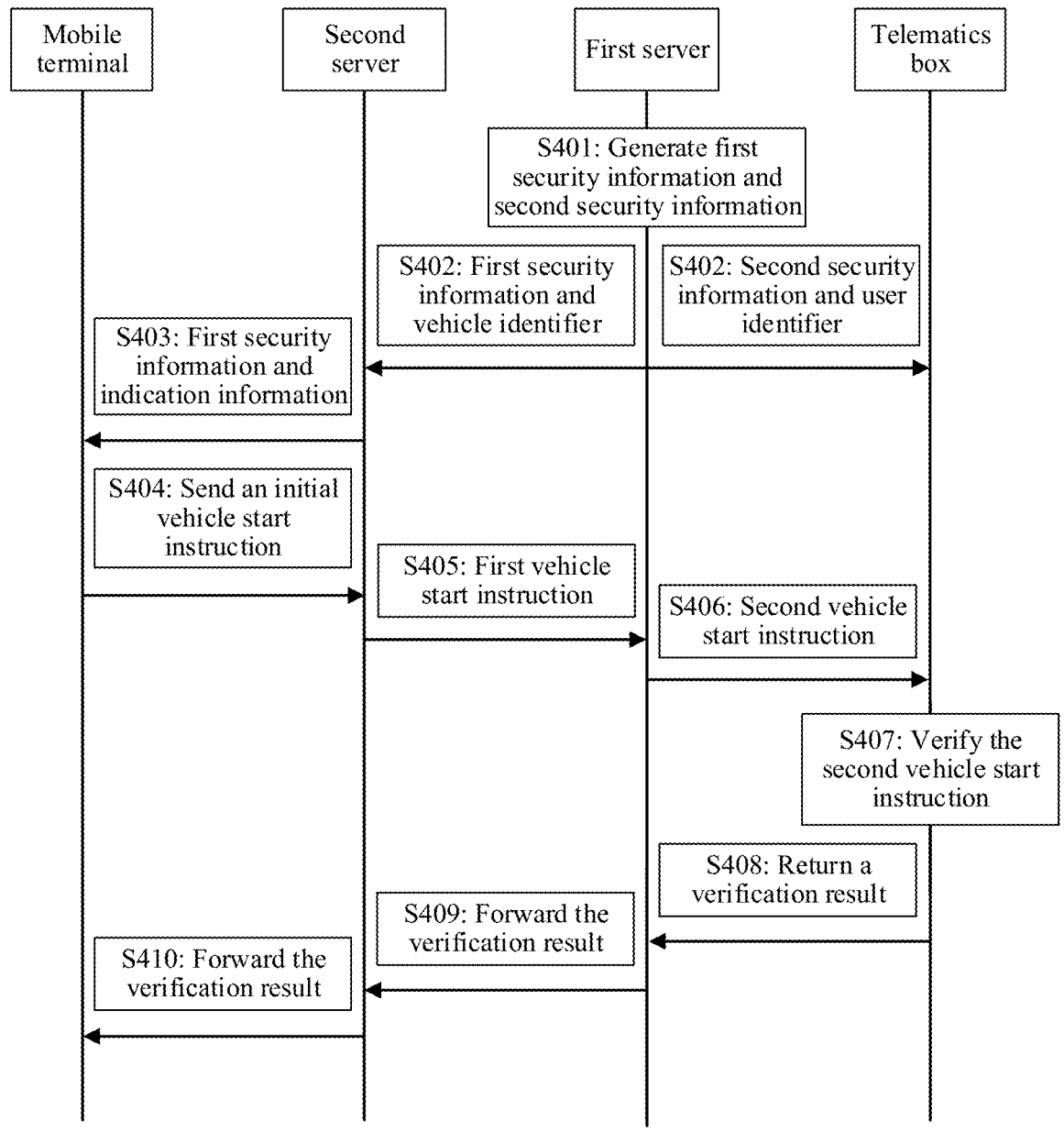
FIG. 4 is a schematic diagram of signaling interaction of yet another method for starting a vehicle according to an embodiment of this application.

It should be noted that the server-related method described in the foregoing embodiment may be implemented by one server device, or may be collaboratively implemented by a plurality of servers. In an example, the servers mentioned in the foregoing embodiments may specifically include a first server and a second server. Specifically, FIG. 4 is a schematic diagram of signaling interaction of a method for starting a vehicle according to an embodiment of this application. The method may specifically include the following steps.

S401: A first server obtains first security information and second security information that are of a vehicle, where the first security information and the second security information are used to verify a vehicle start instruction sent by a mobile terminal to a telematics box.

S402: The first server sends the first security information and a vehicle identifier to a second server through a secure transmission protocol or a secure transmission channel, and sends the second security information and a user identifier of the mobile terminal to the telematics box of the vehicle, where the vehicle identifier is used to indicate the second server to send the first security information and indication information to the mobile terminal, and the indication information is used to identify the vehicle.

In this embodiment, the first server may send the vehicle identifier to the second server, so that the second server obtains, based on the vehicle identifier, the indication information used to identify the vehicle, and indicate the second server to send the indication information and the received first security information to the mobile terminal.

The vehicle identifier and the indication information may be different information. In an example, the vehicle identifier sent by the first server to the second server may specifically be a vehicle VIN, and the indication information obtained by the second server based on the vehicle VIN may specifically be a license plate number. In specific implementation, the second server may establish a mapping relationship between the vehicle identifier and the indication information. In this way, when receiving the vehicle identifier sent by the first server, the second server may determine, based on the vehicle identifier, the indication information that needs to be sent to the mobile terminal.

S403: The second server sends the first security information and the indication information of the vehicle to the mobile terminal corresponding to the vehicle identifier.

S404: The mobile terminal generates an initial vehicle start instruction and sends the initial vehicle start instruction to the second server, where the initial vehicle start instruction carries the indication information and first verification information that is obtained based on the first security information.

S405: The second server sends a first vehicle start instruction to the second server based on the indication information in the received initial vehicle start instruction, where the first vehicle start instruction carries the vehicle identifier and the first verification information.

In this embodiment, the second server may determine, based on the pre-established mapping relationship between the vehicle identifier and the indication information, a vehicle identifier corresponding to the indication information in the initial vehicle start instruction, to generate the first vehicle start instruction based on the vehicle identifier and the first verification information carried in the initial vehicle start instruction, and send the first vehicle start instruction to the first server after the first vehicle start instruction is obtained.

S406: The first server sends a second vehicle start instruction to the telematics box based on the vehicle identifier carried in the received first vehicle start instruction, where the second vehicle start instruction carries the user identifier and second verification information obtained based on the second security information.

S407: The telematics box verifies the received second vehicle start instruction, to obtain a verification result.

S408: The telematics box sends, to the first server, the verification result representing that the verification on the second verification information succeeds.

S409: The first server forwards the received verification result to the second server.

S411: The second server forwards the received verification result to the mobile terminal.

In actual application, the first server may further update the first security information and the second security information and send updated first security information and updated second security information. Specifically, if the first server can receive the verification result fed back by the telematics box to the mobile terminal, and the verification result represents that the verification performed by the telematics box on the second vehicle start instruction succeeds, the first server may update the first security information and the second security information, send the indication information and the updated first security information to the terminal by using the second server, and send the user identifier and the updated second security information to the telematics box. In this way, the first security information and the second security information that are required for verifying the vehicle start instruction are not unchangeable, so that a risk of leaking the first security information and the second security information can further be reduced.

It should be noted that, for a specific implementation of each step in this embodiment, refer to related descriptions in the embodiments shown in FIG. 2 and FIG. 3, and details are not described herein again.

Figure 5:
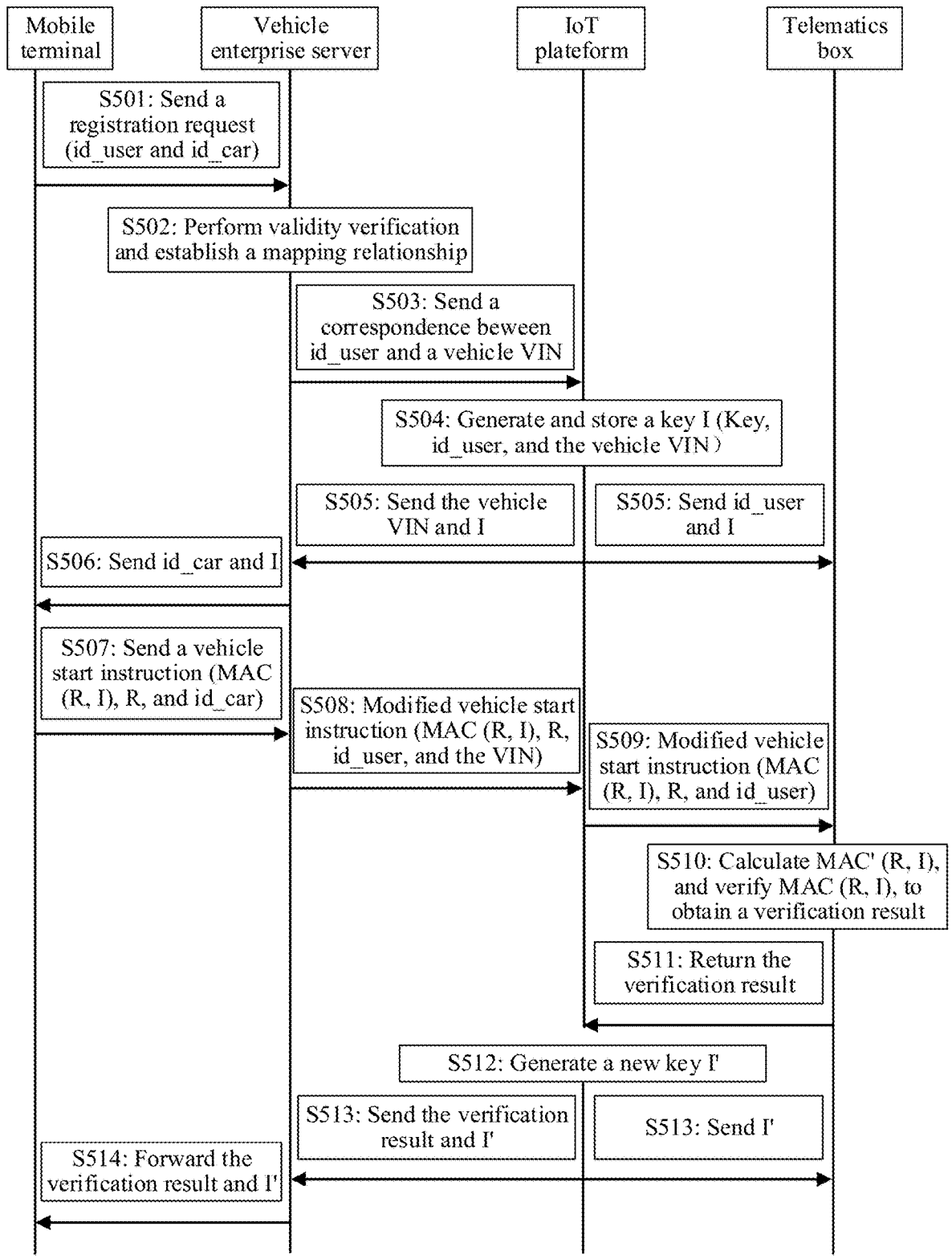
FIG. 5 is a schematic diagram of signaling interaction of a method for starting a vehicle with reference to an application scenario according to an embodiment of this application.

To facilitate understanding of the technical solutions in the embodiments of this application, the following describes the technical solutions in the embodiments of this application in detail with reference to specific application scenarios. In this scenario, the method related to the first server mentioned in the foregoing embodiment is specifically implemented by an IoT (internet of things) platform or an IoT server, and the method related to the second server is specifically implemented by a vehicle enterprise server. FIG. 5 is a schematic diagram of signaling interaction of a method for starting a vehicle according to an embodiment of this application. The method may specifically include the following steps.

S501: A mobile terminal sends a registration request to a vehicle enterprise server, where the registration request carries a user identifier id_user of the mobile terminal and a license plate number id_car of a vehicle.

S502: The vehicle enterprise server performs validity verification based on the received registration request, and after the verification succeeds, establishes a mapping relationship between id_car, id_user, and a vehicle VIN based on the registration request and a pre-stored vehicle VIN.

It may be understood that, in actual application, the vehicle is usually registered with the vehicle enterprise server when the vehicle is delivered from a factory. In this case, after receiving id_user and id_car, the vehicle enterprise server may establish the mapping relationship between id_car, id_user, and the vehicle VIN. In this way, when receiving id_car sent by the mobile terminal, the vehicle enterprise server may determine, based on the foregoing mapping relationship, id_user corresponding to id_car and a vehicle VIN of a vehicle to be started by the mobile terminal.

It should be noted that, in this embodiment of this scenario, an IoT platform is connected to a telematics box, and an instruction used to start the vehicle is sent by the IoT platform to the telematics box. Therefore, when establishing the mapping relationship between id_car, id_user, and the vehicle VIN, the vehicle enterprise server may further establish a correspondence between id_user and the vehicle VIN, so that the IoT platform positions, based on the user identifier id_user of the mobile terminal, the vehicle to be started by the mobile terminal.

S503: The vehicle enterprise server sends the correspondence between id_user and the vehicle VIN to the IoT platform.

The vehicle VIN corresponding to the telematics box has been registered with the IoT platform in advance.

S504: The IoT platform generates a key I based on a root key Key, the user identifier id_user, and the vehicle VIN, and stores the key I.

In this embodiment, the IoT platform generates same encryption information for the mobile terminal and the telematics box, that is, generates a same key. The key is specifically calculated by the IoT platform based on the root key Key, the user identifier id_user, and the vehicle VIN.

S505: The IoT platform sends I and the vehicle VIN to the vehicle enterprise server through a secure transmission channel or a secure transmission protocol, and sends id_user and I to the telematics box.

It should be noted that, to improve security of the key I, in this embodiment, the IoT platform may send the key I to the vehicle enterprise server through the secure transmission channel or the secure transmission protocol, to avoid leakage of the key I caused by transparent transmission between the IoT platform and the vehicle enterprise server.

S506: The vehicle enterprise server determines, based on the mapping relationship between id_car, id_user, and the vehicle VIN, id_car corresponding to the received vehicle VIN, and sends id_car and the received I to the mobile terminal through secure transmission channel or the secure transmission protocol.

S507: The mobile terminal generates a random number R, generates verification information MAC (R, I) based on the random number R and the received I, and sends a vehicle start instruction to the vehicle enterprise server, where the vehicle start instruction includes MAC (R, I), R, and id_car.

S508: The vehicle enterprise server modifies the received vehicle start instruction based on the mapping relationship between id_car, id_user, and the vehicle VIN, and sends a modified vehicle start instruction to the IoT platform, where the modified vehicle start instruction includes MAC (R, I), R, id_user, and the vehicle VIN.

S509: The IoT platform positions the telematics box based on the correspondence between id_user and the vehicle VIN, modifies the received vehicle start instruction, and sends a vehicle start instruction modified by the IoT platform to the telematics box, where the vehicle start instruction modified by the IoT platform carries MAC (R, I), R, and id_user.

S510: The telematics box finds, based on id_user carried in the received vehicle start instruction, I stored in the telematics box, calculates $MAC_1$ (R, I) based on found I and R that is in the vehicle start instruction, and matches $MAC_1$ (R, I) with MAC (R, I) that is carried in the vehicle start instruction. If the matching is consistent, it is determined that the verification succeeds, and a verification result is obtained.

S511: The telematics box returns, to the IoT platform, the verification result representing that the verification succeeds.

S512: If the IoT platform determines that the received verification result represents that the verification succeeds, the IoT platform generates a new key I' for the mobile terminal and the telematics box.

S513: The IoT platform sends the verification result and the new key I' to the vehicle enterprise server, and sends the new key I' to the telematics box system.

In this embodiment, the IoT platform can receive the verification result fed back by the telematics box to the mobile terminal. When the verification result represents that verification performed by the telematics box on the vehicle start instruction succeeds, the IoT platform may update the key, send the verification result and the updated key I' to the terminal, and send the updated key I' to the telematics box. In this way, first encryption information and second encryption information that are required for verifying the vehicle start instruction are not unchangeable, so that a risk of leaking the first encryption information and the second encryption information can further be reduced.

When the telematics box stores the updated key I', the telematics box replaces the original key I with the updated key I', and correspondingly stores the updated key I' and original id_user.

S514: The vehicle enterprise server forwards the verification result and the new key I' to the mobile terminal.

When storing the updated key I', the mobile terminal replaces the original key I with the updated key I', and correspondingly stores the updated key I' and original id_car.

Figure 6:
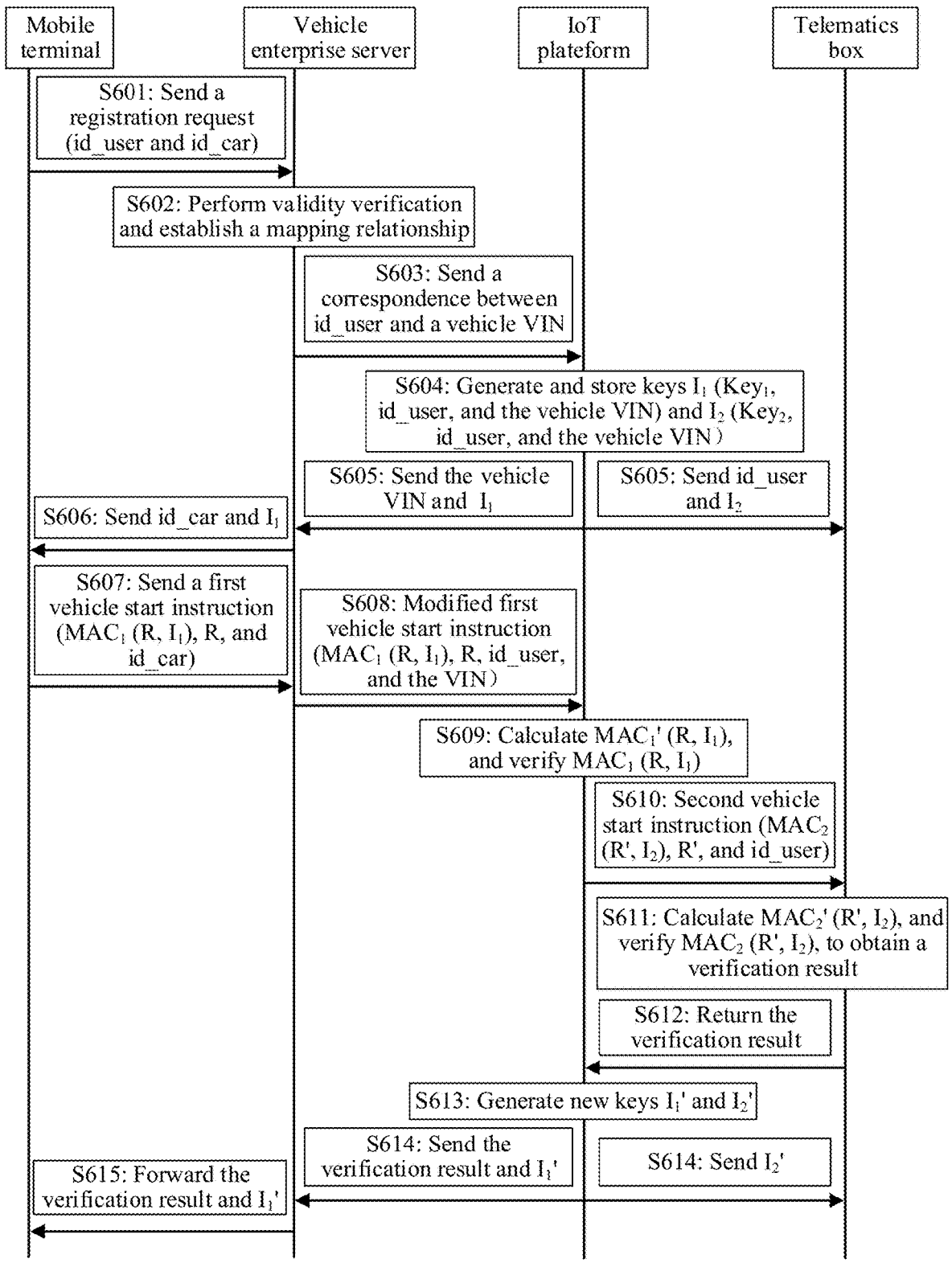
FIG. 6 is a schematic diagram of signaling interaction of still another method for starting a vehicle with reference to an application scenario according to an embodiment of this application.

In the foregoing scenario embodiment, keys generated by the IoT platform for the mobile terminal and the telematics box are the same. However, in some other possible application scenarios, the key generated by the IoT platform for the mobile terminal may be different from the key generated for the telematics box. Specifically, FIG. 6 is a schematic diagram of signaling interaction of still another method for starting a vehicle according to an embodiment of this application. The method may specifically include the following steps.

S601: A mobile terminal sends a registration request to a vehicle enterprise server, where the registration request carries a user identifier id_user of the mobile terminal and a license plate number id_car of a vehicle.

S602: The vehicle enterprise server performs validity verification based on the received registration request, and after the verification succeeds, establishes a mapping relationship between id_car, id_user, and a vehicle VIN based on the registration request and a pre-stored vehicle VIN.

S603: The vehicle enterprise server sends a correspondence between id_user and the vehicle VIN to an IoT platform.

S604: The IoT platform generates a key $I_1$ based on a first root key $Key_1$, a user identifier id_user, and a vehicle VIN, and stores the key $I_1$; and generates a key $I_2$ based on a first root key $Key_2$, a user identifier id_user, and a vehicle VIN, and stores the key $I_2$.

S605: The IoT platform sends $I_1$ and the vehicle VIN to the vehicle enterprise server through a secure transmission channel or a secure transmission protocol, and sends id_user and $I_2$ to the telematics box.

S606: The vehicle enterprise server determines, based on the mapping relationship between id_car, id_user, and the vehicle VIN, id_car corresponding to the received vehicle VIN, and sends id_car and the received $I_1$ to the mobile terminal through secure transmission channel or the secure transmission protocol.

S607: The mobile terminal generates a random number R, generates verification information $MAC_1$ (R, $I_1$) based on the random number R and the received $I_1$, and sends a first vehicle start instruction to the vehicle enterprise server, where the first vehicle start instruction includes $MAC_1$ (R, $I_1$), R, and id_car.

S608: The vehicle enterprise server modifies the received first vehicle start instruction based on the mapping relationship between id_car, id_user, and the vehicle VIN, and sends a modified first vehicle start instruction to the IoT platform, where the modified first vehicle start instruction includes $MAC_1$ (R, $I_1$), R, id_user, and the vehicle VIN.

S609: The IoT platform calculates verification information $MAC_1'$ (R, $I_1$) based on R carried in the received first vehicle start instruction and $I_1$ stored in the IoT platform, and matches $MAC_1'$ (R, $I_1$) with $MAC_1$ (R, $I_1$) that is carried in the vehicle start instruction. If the matching is consistent, the verification succeeds.

S610: If it is determined that the verification on $MAC_1$ (R, $I_1$) succeeds, the IoT platform may position the telematics box based on the correspondence between id_user and the vehicle VIN, generate a second vehicle start instruction, and send the second vehicle start instruction to the telematics box, where the second vehicle start instruction carries second verification information $MAC_2$ (R', $I_2$), a random number R', and id_user. $MAC_2$ (R', $I_2$) is generated by the IoT platform based on the key $I_2$ stored in the IoT platform and the new random number R'.

S611: The telematics box finds, based on id_user carried in the received second vehicle start instruction, $I_2$ stored in the telematics box, calculates $MAC_2'$ (R', $I_2$) based on found $I_2$ and R' that is in the second vehicle start instruction, and matches $MAC_2'$ (R', $I_2$) with MAC(R', $I_2$) that is carried in the second vehicle start instruction. If the matching is consistent, the verification succeeds, and a verification result is obtained.

S612: The telematics box returns, to the IoT platform, the verification result representing that the verification succeeds.

S613: If the IoT platform determines that the received verification result represents that the verification succeeds, the IoT platform generates a new key $I_1'$ for the mobile terminal, and generates a new key $I_2'$ for the telematics box.

S614: The IoT platform sends the verification result and the new key $I_1'$ to the vehicle enterprise server, and sends the new key $I_2'$ to the telematics box.

When the telematics box stores the updated key $I_2'$, the telematics box replaces the original key $I_2$ with the updated key $I_2'$, and correspondingly stores the updated key $I_2'$ and original id_user.

S615: The vehicle enterprise server forwards the verification result and the new key $I_1'$ to the mobile terminal.

When storing the updated key the mobile terminal replaces the original key $I_1$ with the updated key and correspondingly stores the updated key $I_1'$ and original id_car.

In this embodiment, the IoT platform generates different keys for the mobile terminal and the telematics box. The IoT platform can verify, based on the different keys, first verification information sent by the mobile terminal, and the telematics box can verify second verification information sent by the IoT platform. Two verification processes can be used to improve security of a vehicle start process and reduces a risk that the vehicle is maliciously started.

Figure 7:
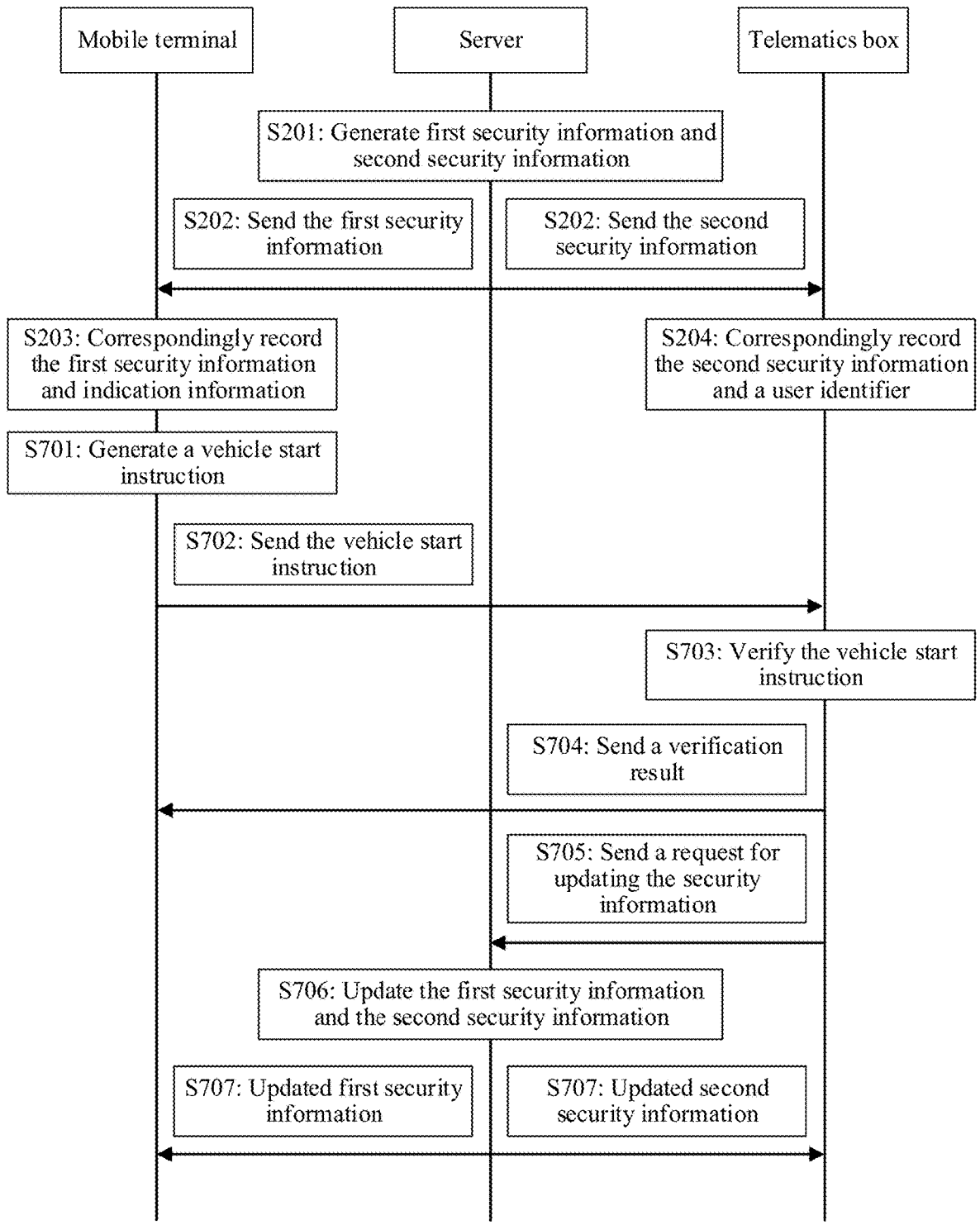
FIG. 7 is a schematic diagram of signaling interaction of yet another method for starting a vehicle according to an embodiment of this application.

In the embodiments shown in FIG. 3 to FIG. 6, the vehicle start instruction is transmitted to the telematics box by using the server. In some other possible implementations, after the mobile terminal and the telematics box receive the encryption information sent by the server, the mobile terminal may directly send, based on a near field communication technology, for example, NFC and Bluetooth, the vehicle start instruction to the telematics box without participation of the server. Specifically, FIG. 7 is another schematic diagram of signaling interaction for starting a vehicle. In the embodiment shown in FIG. 2, the method may further specifically include the following steps.

S701: A mobile terminal generates a vehicle start instruction, where the vehicle start instruction carries at least first verification information obtained based on first encryption information.

In an example implementation, if determining that a vehicle needs to be started, the mobile terminal may generate the first verification information based on the recorded first encryption information, and generate, based on the obtained first verification information, the vehicle start instruction used to trigger the vehicle to start. In this embodiment, a specific implementation of generating the first verification information based on the first encryption information is similar to the manner of generating the first verification information in the foregoing embodiment. For details, refer to the foregoing related descriptions. Details are not described herein again.

S702: The mobile terminal sends the vehicle start instruction to a telematics box based on a near field communication technology.

In this embodiment, the mobile terminal may specifically send the generated vehicle start instruction to the telematics box based on the NFC technology or Bluetooth technology, and the vehicle start instruction carries the first verification information.

S703: The telematics box verifies the received vehicle start instruction by using recorded second encryption information, to obtain a verification result.

In an example of a specific implementation, the telematics box may generate second verification information by using the pre-recorded second encryption information, and compare the second verification information with the first verification information carried in the vehicle start instruction. If the first verification information is consistent with the second verification information, it is determined that the verification on the vehicle start instruction succeeds, and a verification result indicating that the verification succeeds is obtained. If the first verification information is inconsistent with the second verification information, it is determined that the verification on the vehicle start instruction fails, and a verification result indicating that the verification fails is obtained.

It should be noted that, in this embodiment, the first encryption information and the second encryption information that are delivered by a server to the mobile terminal and the telematics box respectively may be same encryption information, and correspondingly, the first encryption information and the second encryption information that are generated based on the same encryption information may also be the same.

S704: The telematics box returns the verification result to the mobile terminal.

After obtaining the verification result, the telematics box may return the verification result to the mobile terminal through the near field communication technology, for example, NFC or Bluetooth, to notify the mobile terminal of the verification result of the telematics box for the vehicle start instruction.

S705: The telematics box sends, to the server, a request for updating the encryption information.

In this embodiment, if the telematics box determines that the verification on the vehicle start instruction succeeds, the telematics box may send the request for updating the encryption information to the server, to request the server to update and deliver the request to the mobile terminal and the server of the telematics box. In this way, the first encryption information and the second encryption information that are required for verifying the vehicle start instruction are not unchangeable, so that a risk of leaking the first encryption information and the second encryption information can further be reduced.

S706: The server generates updated first encryption information and updated second encryption information.

S707: The server sends the updated first encryption information to the mobile terminal, and sends the updated second encryption information to the telematics box.

Figure 8:
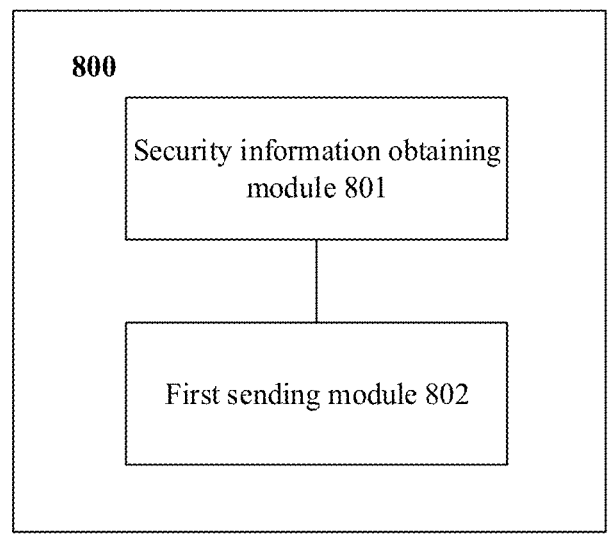
FIG. 8 is a schematic structural diagram of an apparatus for starting a vehicle according to an embodiment of this application.

In addition, an embodiment of this application further provides an apparatus for starting a vehicle. FIG. 8 shows an apparatus for starting a vehicle according to an embodiment of this application. The apparatus 800 is used in a server, and the apparatus 800 includes the following modules.

A security information obtaining module 801 is configured to obtain first security information and second security information that are of the vehicle. The first security information and the second security information are used to verify a vehicle start instruction sent by a mobile terminal to a telematics box.

A first sending module 802 is configured to: send the first security information and indication information of the vehicle to the mobile terminal through a secure transmission channel or a secure transmission protocol, and send the second security information and a user identifier of the mobile terminal to the telematics box of the vehicle. The indication information is used to identify the vehicle.

In some possible implementations, the apparatus 800 further includes the following modules.

A first receiving module is configured to receive a first vehicle start instruction sent by the mobile terminal. The first vehicle start instruction carries the indication information and first verification information that is obtained based on the first security information.

A second sending module is configured to send a second vehicle start instruction to the telematics box based on the indication information. The second vehicle start instruction carries the user identifier and second verification information that is obtained based on the second security information.

A second receiving module is configured to receive a first verification result obtained after the telematics box verifies the second verification information, and send the first verification result to the mobile terminal.

In some possible implementations, the first security information and the second security information are same security information, and the first verification information and the second verification information are same verification information.

In some possible implementations, the first security information and the second security information are different same security information, and the first verification information and the second verification information are different verification information. The second sending module includes the following units.

A first obtaining unit is configured to obtain the first security information based on the indication information. A verification unit is configured to verify the first verification information based on the first security information.

A second obtaining unit is configured to: if the verification on the first verification information succeeds, obtain the second security information based on the user identifier.

A generation unit is configured to: if the verification on the first verification information succeeds, generate the second verification information based on the second security information.

A sending unit is configured to send, to the telematics box based on an identifier of the vehicle, the second vehicle start instruction that carries the second verification information.

In some possible implementations, both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number.

In some possible implementations, the first security information is generated based on a first root key, the user identifier, and the identifier of the vehicle; and the second security information is generated based on a second root key, the user identifier, and the identifier of the vehicle.

In some possible implementations, the security information obtaining module is specifically configured to generate the first security information and the second security information if a second verification result sent by the telematics box to the mobile terminal is received and the second verification result indicates that the verification succeeds. Alternatively, the security information obtaining module is specifically configured to generate the first security information and the second security information in response to a registration request of the mobile terminal for the telematics box.

In some possible implementations, the apparatus 800 further includes the following module.

A creation module is configured to create registration information in response to the registration request of the mobile terminal for the telematics box. The registration information is used to indicate a correspondence between the user identifier and the identifier of the vehicle.

It should be noted that the apparatus for starting the vehicle shown in FIG. 8 is an apparatus corresponding to the methods for starting the vehicle shown in FIG. 2 and FIG. 3. A specific implementation process is similar to the methods shown in FIG. 2 and FIG. 3. Refer to the descriptions of the methods shown in FIG. 2 and FIG. 3. Details are not described herein again.

Figure 9:
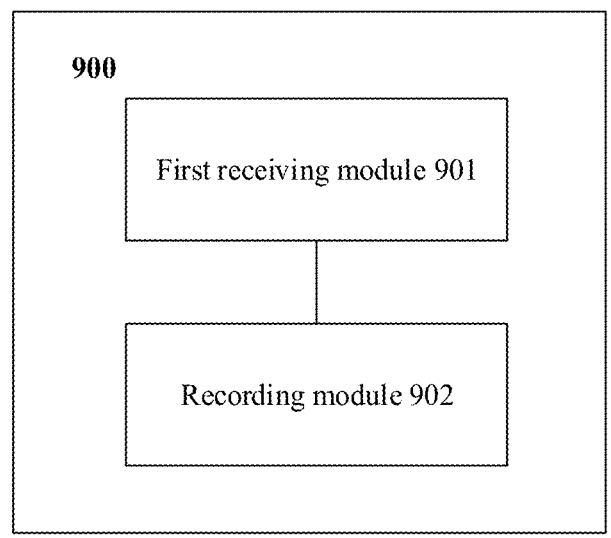
FIG. 9 is a schematic structural diagram of still another apparatus for starting a vehicle according to an embodiment of this application.

In addition, an embodiment of this application further provides still another apparatus for starting a vehicle. FIG. 9 shows still another apparatus for starting a vehicle according to an embodiment of this application. The apparatus 900 is used in a mobile terminal, and the apparatus 900 includes the following modules.

A first receiving module 901 is configured to receive, through a secure transmission channel or a secure transmission protocol, indication information and security information that are of the vehicle and that are sent by a server. The indication information is used to identify at least the vehicle.

A recording module 902 is configured to correspondingly record the indication information and the security information. The security information is used to verify a vehicle start instruction sent by the mobile terminal to the telematics box.

In some possible implementations, the apparatus 900 further includes the following modules.

A first sending module is configured to send the vehicle start instruction to the server.

A second receiving module is configured to receive a verification result returned by the server. The vehicle start instruction carries the indication information and verification information that is obtained based on the security information.

In some possible implementations, the security information is a key, the vehicle start instruction further carries a random number, and the verification information is obtained based on the security information and the random number.

In some possible implementations, the apparatus 900 further includes: a second sending module, configured to send a registration request to the server, so that the server creates registration information and sends the indication information and the security information. The registration information is used to indicate a correspondence between the user identifier and an identifier of the vehicle.

It should be noted that the apparatus for starting the vehicle shown in FIG. 9 is an apparatus corresponding to the methods for starting the vehicle shown in FIG. 2 and FIG. 3. A specific implementation process is similar to the methods shown in FIG. 2 and FIG. 3. Refer to the descriptions of the methods shown in FIG. 2 and FIG. 3. Details are not described herein again.

Figure 10:
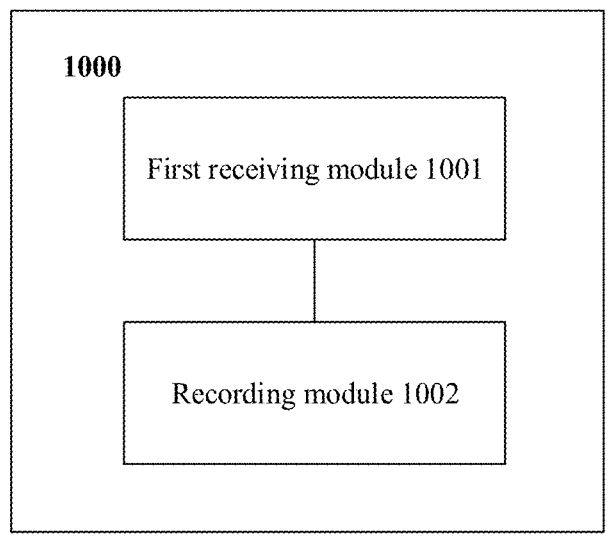
FIG. 10 is a schematic structural diagram of yet another apparatus for starting a vehicle according to an embodiment of this application.

In addition, an embodiment of this application further provides yet another apparatus for starting a vehicle. FIG. 10 shows yet another apparatus for starting a vehicle according to an embodiment of this application. The apparatus 1000 is used in a telematics box, and the apparatus 1000 includes the following modules.

A first receiving module 1001 is configured to receive, through a secure transmission protocol or a secure transmission channel, security information of the vehicle and a user identifier of a mobile terminal that are sent by a server.

A recording module 1002 is configured to correspondingly record the user identifier and the security information. The security information is used to verify a vehicle start instruction sent by the mobile terminal to the telematics box.

In some possible implementations, the apparatus 1000 further includes the following modules.

A second receiving module is configured to receive the vehicle start instruction sent by the server. The vehicle start instruction carries the user identifier and verification information that is obtained based on the security information.

An obtaining module is configured to obtain the security information based on the user identifier.

A verification module is configured to verify the verification information based on the security information, to obtain a verification result.

A sending module is configured to send the verification result to the mobile terminal by using the server.

In some possible implementations, the security information is a key, the vehicle start instruction further carries a random number, and the verification information is obtained based on the security information and the random.

The verification module is configured to verify the verification information based on the security information and the random number, to obtain the verification result.

It should be noted that the apparatus for starting the vehicle shown in FIG. 10 is an apparatus corresponding to the methods for starting the vehicle shown in FIG. 2 and FIG. 3. A specific implementation process is similar to the methods shown in FIG. 2 and FIG. 3. Refer to the descriptions of the methods shown in FIG. 2 and FIG. 3. Details are not described herein again.

Figure 11:
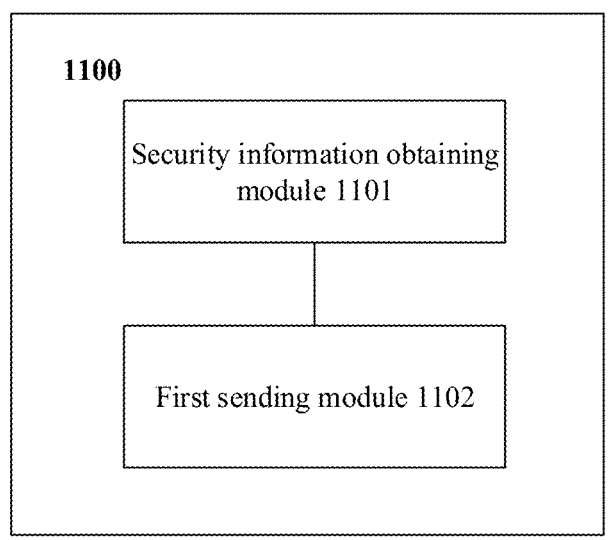
FIG. 11 is a schematic structural diagram of yet another apparatus for starting a vehicle according to an embodiment of this application.

In addition, an embodiment of this application further provides yet another apparatus for starting a vehicle. FIG. 11 shows yet another apparatus for starting a vehicle according to an embodiment of this application. The apparatus 1100 is used to a first server, and the apparatus 1100 includes the following modules.

A security information obtaining module 1101 is configured to obtain first security information and second security information that are of the vehicle.

The first security information and the second security information are used to verify a vehicle start instruction sent by the mobile terminal to the telematics box.

A first sending module 1102 is configured to send the first security information and an identifier of the vehicle to a second server through a secure transmission channel or a secure transmission protocol, and send the second security information and a user identifier of the mobile terminal to the telematics box of the vehicle. The identifier of the vehicle is used to indicate the second server to send the first security information and indication information to the mobile terminal, and the indication information is used to identify the vehicle.

In some possible implementations, the apparatus 1100 further includes the following modules.

A first receiving module is configured to receive a first vehicle start instruction sent by the second server. The first vehicle start instruction carries the identifier of the vehicle and first verification information that is obtained based on the first security information.

A second sending module is configured to send a second vehicle start instruction to the telematics box based on the identifier of the vehicle. The second vehicle start instruction carries the user identifier and second verification information that is obtained based on the second security information.

A second receiving module is configured to receive a first verification result obtained after the telematics box verifies the second verification information, and send the first verification result to the second server.

In some possible implementations, the first security information and the second security information are same security information, and the first verification information and the second verification information are same verification information.

In some possible implementations, the first security information and the second security information are different same security information, and the first verification information and the second verification information are different verification information. The second sending module includes the following units.

A first obtaining unit is configured to obtain the first security information based on the identifier of the vehicle.

A verification unit is configured to verify the first verification information based on the first security information.

A first obtaining unit is configured to: if the verification on the first verification information succeeds, obtain the second security information based on the user identifier.

A generation unit is configured to: if the verification on the first verification information succeeds, generate the second verification information based on the second security information.

A sending unit is configured to send, to the telematics box based on the identifier of the vehicle, the second vehicle start instruction that carries the second verification information.

In some possible implementations, both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number.

In some possible implementations, the first security information is generated based on a first root key, the user identifier, and the identifier of the vehicle; and the second security information is generated based on a second root key, the user identifier, and the identifier of the vehicle.

In some possible implementations, the security information obtaining module is specifically configured to generate, the first security information and the second security information if a second verification result sent by the telematics box to the mobile terminal is received and the second verification result indicates that the verification succeeds.

Alternatively, the security information obtaining module is specifically configured to generate the first security information and the second security information in response to a registration request of the mobile terminal for the telematics box.

It should be noted that the apparatus for starting the vehicle shown in FIG. 11 is an apparatus corresponding to the method for starting the vehicle shown in FIG. 4. A specific implementation process is similar to the methods shown in FIG. 4. Refer to the descriptions of the methods shown in FIG. 4. Details are not described herein again.

In the foregoing embodiment, the apparatus for starting the vehicle in the embodiments of this application is described from a perspective of a functional entity. The following describes in detail a device for starting a vehicle in the embodiments of this application from a perspective of hardware processing.

Figure 12:
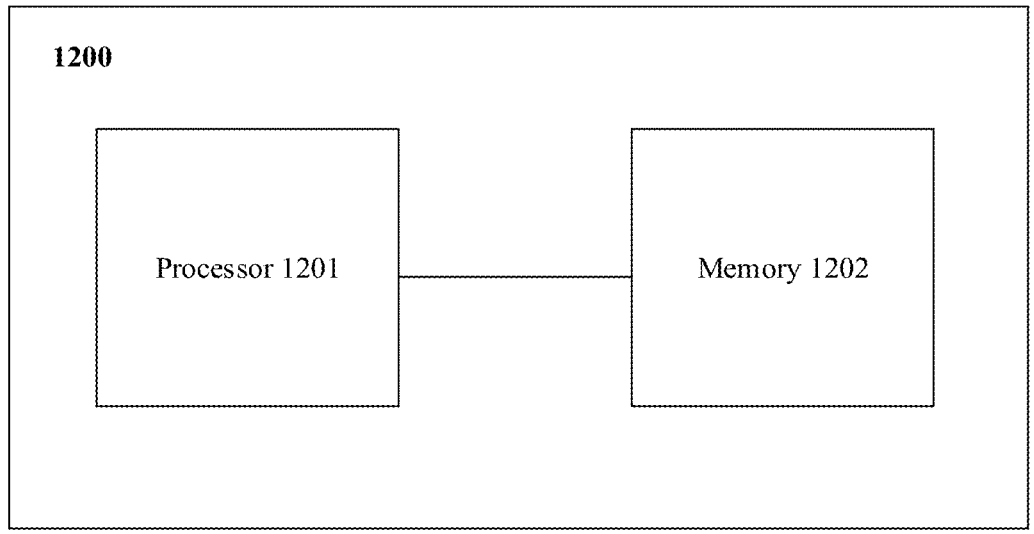
FIG. 12 is a schematic structural diagram of a device for starting a vehicle according to an embodiment of this application.

The following describes the device in detail. FIG. 12 shows a device for starting a vehicle in an embodiment of this application, and the device may be used in the foregoing mobile terminal, the server, the telematics box, and the first server. The device 1200 includes a processor 1201 and a memory 1202.

The memory 1202 is configured to store program code and transmit the program code to the processor 1201.

The processor 1201 is configured to perform, according to instructions in the program code, the methods for starting the vehicle shown in FIG. 2 to FIG. 7.

Figure 13:
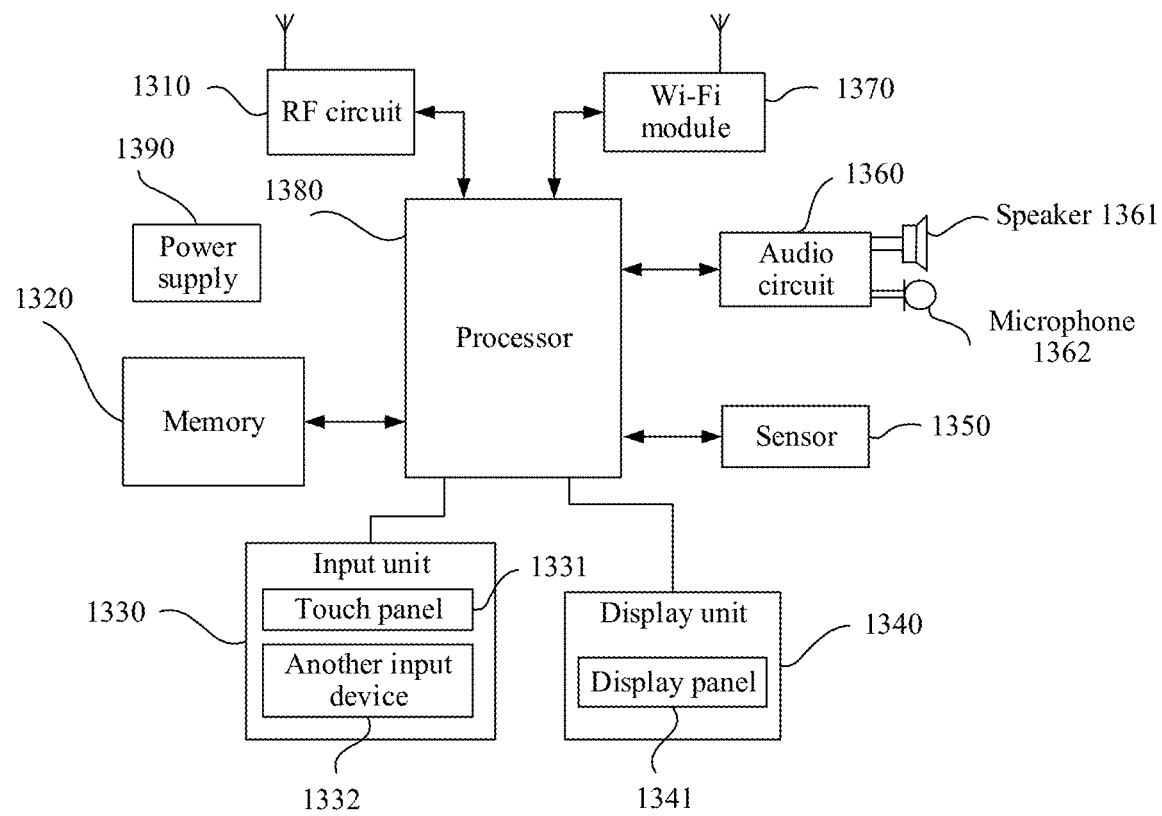
FIG. 13 shows an example embodiment of a mobile terminal according to an embodiment of this application.

The foregoing describes the mobile terminal and the server in the embodiments of this application from a perspective of function modularization, and the following describes the mobile terminal in the embodiments of this application from a perspective of physical hardware processing. The mobile station terminal in the embodiments of this application may include a mobile phone, a tablet computer, and an ARM architecture-based device, for example, a PDA (Personal Digital Assistant) or a vehicle-mounted computer. An example in which the terminal is a mobile phone is used below. Referring to FIG. 13, an example embodiment of a mobile terminal in an embodiment of this application includes:

Components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art may understand that the structure of the mobile phone shown in FIG. 13 does not constitute a limitation on the mobile phone, and the mobile phone may include more or fewer components than those shown in the figure, combine some components, or have different component arrangements.

Each component of the mobile phone is specifically described below with reference to FIG. 13.

The RF circuit 1310 may be configured to receive and send a signal in an information receiving and sending process or a call process. In particular, after receiving downlink information from a base station, the RF circuit 1310 sends the downlink information to the processor 1380 for processing. In addition, the RF circuit 1310 sends related uplink data to the base station. Usually, the RF circuit 1310 includes but is not limited to an antenna, at least one amplifier, a transceiver, a coupler, a low noise amplifier (LNA), a duplexer, and the like. In addition, the RF circuit 1310 may further communicate with a network and another device through radio communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 1320 may be configured to store a software program and a module. The processor 1380 runs the software program and the module stored in the memory 1320 to perform various function applications of the mobile phone and data processing. The memory 1320 may mainly include a program storage area and a data storage area. The program storage area may store an operating system, an application program required by at least one function (such as a voice playing function and an image playing function), and the like. The data storage area may store data (such as audio data and an address book) created based on use of the mobile phone, and the like. In addition, the memory 1320 may include a high-speed random access memory, and may further include a nonvolatile memory, for example, at least one magnetic disk storage device, a flash memory device, or another volatile solid-state storage device.

The input unit 1330 may be configured to receive entered digit or character information, and generate a key signal input related to user setting and function control of the mobile phone. Specifically, the input unit 1330 may include a touch panel 1331 and another input device 1332. The touch panel 1331, also referred to as a touchscreen, can collect a touch operation performed by a user on or near the touch panel 1331 (for example, an operation performed by the user on or near the touch panel 1331 by using any proper object or accessory such as a finger or a tablet pen), and drive a corresponding connection apparatus according to a preset program. Optionally, the touch panel 1331 may include two parts: a touch detection apparatus and a touch controller. The touch detection apparatus detects a touch position of the user, detects a signal generated by the touch operation, and transmits the signal to the touch controller. The touch controller receives touch information from the touch detection apparatus, converts the touch information into coordinates of a touch point, and then sends the coordinates of the touch point to the processor 1380. The touch controller can receive and execute a command sent by the processor 1380. In addition, the touch panel 1331 may be implemented in a plurality of types, such as a resistive type, a capacitive type, an infrared type, and a surface acoustic wave type. In addition to the touch panel 1331, the input unit 1330 may further include the another input device 1332. Specifically, the another input device 1332 may include but is not limited to one or more of a physical keyboard, a function key (for example, a volume control key or a power on/off key), a trackball, a mouse, a joystick, and the like.

A display unit 1340 may be configured to display information entered by a user, information provided to the user, and various menus of the mobile phone. The display unit 1340 may include a display panel 1341. Optionally, the display panel 1341 may be configured in a form of a liquid crystal display (LCD), an organic light-emitting diode (OLED), or the like. Further, the touch panel 1331 may cover the display panel 1341. When detecting the touch operation on or near the touch panel 1331, the touch panel 1331 transmits the touch operation to the processor 1380 to determine a type of a touch event. Then, the processor 1380 provides a corresponding visual output on the display panel 1341 based on the type of the touch event. In FIG. 13, the touch panel 1331 and the display panel 1341 are used as two independent components to implement input and input functions of the mobile phone. However, in some embodiments, the touch panel 1331 and the display panel 1341 may be integrated to implement the input and output functions of the mobile phone.

The mobile phone may further include at least one sensor 1350, for example, an optic sensor, a movement sensor, and another sensor. Specifically, the optical sensor may include an ambient light sensor and a proximity sensor. The ambient light sensor may adjust luminance of the display panel 1341 based on brightness of ambient light, and when the mobile phone approaches an ear, the proximity sensor may turn off the display panel 1341 and/or backlight. As a type of motion sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may further be configured in the mobile phone. Details are not described herein again.

An audio circuit 1360, a speaker 1361, and a microphone 1362 may provide an audio interface between the user and the mobile phone. The audio circuit 1360 may convert received audio data into an electrical signal, and transmit the electrical signal to the speaker 1361, and the speaker 1361 converts the electrical signal into a sound signal for output. In addition, the microphone 1362 converts a collected sound signal into an electrical signal, and the audio circuit 1360 receives the electrical signal, converts the electrical signal into audio data, and outputs the audio data to the processor 1380 for processing, so as to send the audio data to, for example, another mobile phone by using the RF circuit 1310, or output the audio data to the memory 1320 for further processing.

Wi-Fi is a short-range wireless transmission technology, and the mobile phone may help, by using the Wi-Fi module 1370, the user to send and/or receive an e-mail, browse a web page, access streaming media, and the like. The Wi-Fi module 1370 provides wireless broadband internet access for the user. Although the Wi-Fi module 1370 is shown in FIG. 13, it may be understood that the Wi-Fi module 1370 is not a mandatory component of the mobile phone, and may be totally omitted as required without changing the essence of the present invention.

The processor 1380 is a control center of the mobile phone, and is connected to all parts of the mobile phone through various interfaces and lines. By running or executing the software program and/or the module stored in the memory 1320, and invoking data stored in the memory 1320, the processor 1380 performs various functions and data processing of the mobile phone, to perform overall monitoring on the mobile phone. Optionally, the processor 1380 may include one or more processing units. Preferably, the processor 1380 may be integrated with an application processor and a modem processor. The application processor mainly processes an operating system, a user interface, an application program, and the like. The modem processor mainly processes wireless communication. It may be understood that the modem processor may alternatively not be integrated into the processor 1380.

The mobile phone further includes the power supply 13130 (for example, a battery) that supplies power to each component. Preferably, the power supply may be logically connected to the processor 1380 through a power management system, to implement functions such as charging, discharging, and power consumption management through the power management system.

Although not shown, the mobile phone may further include a camera, a Bluetooth module, and the like. Details are not described herein again.

In this embodiment of this application, the processor 1380 included in the terminal has the following functions:

receiving, through a secure transmission protocol or a secure transmission channel, indication information and security information that are of a vehicle and that are sent by a server, where the indication information is used to identify at least the vehicle; and correspondingly recording the indication information and the security information, where the security information is used to verify a vehicle start instruction sent by the mobile terminal to the telematics box.

Figure 14:
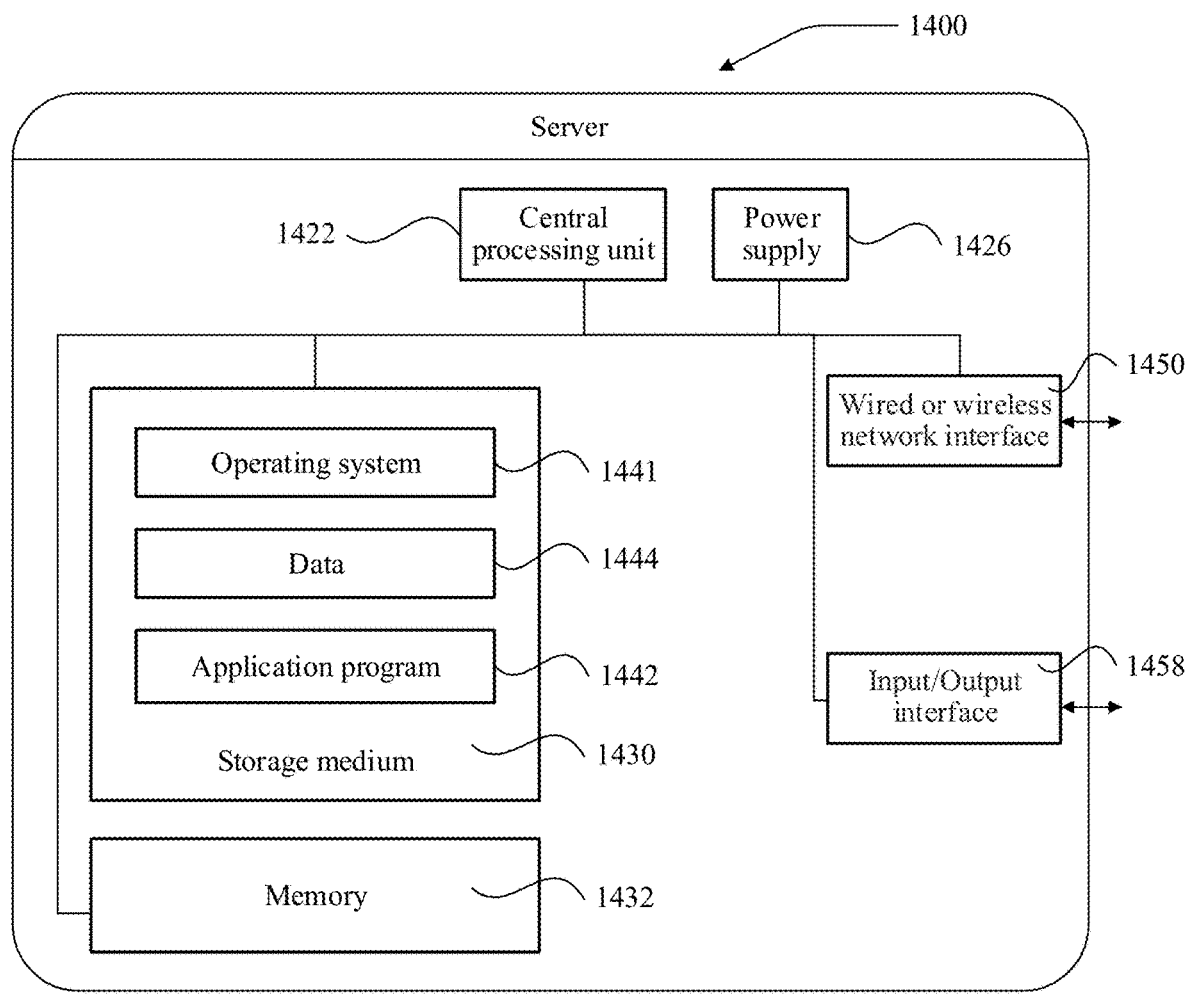
FIG. 14 shows an example embodiment of a server according to an embodiment of this application.

The following describes a server in an embodiment of this application from a perspective of physical hardware processing. FIG. 14 is a schematic diagram of a structure of a server according to an embodiment of this application. The server 1400 may vary greatly due to different configurations or performance, and may include at least one central processing unit (CPU) 1422 (for example, at least one processor), a memory 1432, and at least one storage medium 1430 (for example, at least one mass storage device) that store an application program 1442 or data 1444. The memory 1432 and the storage medium 1430 may be used for temporary storage or permanent storage. A program stored in the storage medium 1430 may include at least one module (not shown in the figure), and each module may include a series of instruction operations for the server. Further, the central processing unit 1422 may be configured to communicate with the storage medium 1430, and perform, on the server 1400, the series of instruction operations in the storage medium 1430.

The server 1400 may further include at least one power supply 1426, at least one wired or wireless network interface 1450, at least one input/output interface 1458, and/or at least one operating system 1441 such as Windows Server™, Mac OS X™, Unix™, Linux™, and FreeBSD™.

In this embodiment of this application, the central processing unit 1422 specifically performs the following steps:

obtaining first security information and second security information that are of a vehicle, where the first security information and the second security information are used to verify a vehicle start instruction sent by a mobile terminal to a telematics box; and sending the first security information and indication information of the vehicle to the mobile terminal through a secure transmission protocol or a secure transmission channel, and sending the second security information and a user identifier of the mobile terminal to the telematics box of the vehicle, where the indication information is used to identify the vehicle.

In addition, in another embodiment of the processor in the embodiments of this application, the central processing unit 1401 may specifically alternatively perform the following procedure:

obtaining first security information and second security information that are of a vehicle, where the first security information and the second security information are used to verify a vehicle start instruction sent by a mobile terminal to a telematics box; and sending the first security information and an identifier of the vehicle to a second server through a secure transmission protocol or a secure transmission channel, and sending the second security information and a user identifier of the mobile terminal to the telematics box of the vehicle, where the identifier of the vehicle is used to indicate the second server to send the first security information and indication information to the mobile terminal, and the indication information is used to identify the vehicle.

In addition, an embodiment of this application further provides a computer-readable storage medium. The computer-readable storage medium stores instructions. When the instructions are run on a computer or a processor, the computer or the processor is enabled to perform the method for starting the vehicle described in FIG. 2 to FIG. 7.

In addition, an embodiment of this application further provides a computer program product including instructions. When the computer program product is run on a computer or a processor, the computer or the processor is enabled to perform the method for starting the vehicle described in FIG. 2 to FIG. 7.

"First" in names such as the "first security information", the "first verification information", and the "first sending module" mentioned in the embodiments of this application is merely used as a name identifier, and does not represent the first in sequence. This rule is also applicable to "second" and the like.

From the foregoing descriptions of the implementations, a person skilled in the art may clearly understand that some or all steps of the methods in the embodiments may be implemented by software in addition to a universal hardware platform. Based on such understanding, the technical solutions of this application may be implemented in a form of a software product. The software product may be stored in a storage medium, such as a read-only memory (ROM)/RAM, a magnetic disk, or an optical disc, and includes several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, apparatus and device embodiments are basically similar to a method embodiment, and therefore is described briefly. For related parts, refer to partial descriptions in the method embodiment. The described device and apparatus embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The foregoing descriptions are merely example implementations of this application, but are not intended to limit the protection scope of this application.

What is claimed is:

1. A method for starting a vehicle comprising:
   obtaining, by a server, first security information and second security information that are of the vehicle, wherein the first security information and the second security information verify a vehicle start instruction sent by a mobile terminal to a telematics box; and
   sending, by the server, the first security information and indication information of the vehicle to the mobile terminal through a secure transmission protocol or a secure transmission channel, and sending the second security information and a user identifier of the mobile terminal to the telematics box of the vehicle, wherein the indication information identifies the vehicle.

2. The method according to claim 1, further comprising:
   receiving, by the server, a first vehicle start instruction sent by the mobile terminal, wherein the first vehicle start instruction carries the indication information and first verification information that is obtained based on the first security information;
   sending, by the server, a second vehicle start instruction to the telematics box based on the indication information, wherein the second vehicle start instruction carries the user identifier and second verification information that is obtained based on the second security information; and
   receiving, by the server, a first verification result obtained after the telematics box verifies the second verification information, and sending the first verification result to the mobile terminal.

3. The method according to claim 2, wherein the first security information and the second security information are same security information, and the first verification information and the second verification information are same verification information.

4. The method according to claim 2, wherein the first security information and the second security information are different security information, and the first verification information and the second verification information are different verification information; and
   wherein the sending the second vehicle start instruction to the telematics box based on the indication information comprises:
   obtaining, by the server, the first security information based on the indication information, and verifying the first verification information based on the first security information;
   in response to the verification on the first verification information being successful, obtaining, by the server, the second security information based on the user identifier, and generating the second verification information based on the second security information; and sending, by the server to the telematics box based on an identifier of the vehicle, the second vehicle start instruction that carries the second verification information.

5. The method according to claim 2, wherein both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number.

6. The method according to claim 5, wherein the first security information is generated based on a first root key, the user identifier, and the identifier of the vehicle; and the second security information is generated based on a second root key, the user identifier, and the identifier of the vehicle.

7. The method according to claim 1, wherein the obtaining the first security information and second security information further comprises:
generating, by the server, the first security information and the second security information in response to a second verification result sent by the telematics box to the mobile terminal being received and the second verification result indicating that the verification succeeds.

8. The method according to claim 7, further comprising:
creating, by the server, registration information in response to the registration request of the mobile terminal for the telematics box, wherein the registration information indicates a correspondence between the user identifier and the identifier of the vehicle.

9. A method for starting a vehicle, comprising:
receiving, by a mobile terminal through a secure transmission protocol or a secure transmission channel, indication information and security information that are of the vehicle and that are sent by a server, wherein the indication information identifies at least the vehicle; and
correspondingly recording, by the mobile terminal, the indication information and the security information, wherein
the security information verifies a vehicle start instruction sent by the mobile terminal to the telematics box.

10. The method according to claim 9, further comprising:
sending, by the mobile terminal, the vehicle start instruction to the server, and receiving a verification result returned by the server, wherein the vehicle start instruction carries the indication information and verification information that is obtained based on the security information.

11. The method according to claim 9, wherein the security information is a key, the vehicle start instruction further carries a random number, and the verification information is obtained based on the security information and the random number.

12. The method according to claim 9, further comprising:
sending, by the mobile terminal, a registration request to the server, so that the server creates registration information and sends the indication information and the security information, wherein the registration information indicates a correspondence between the user identifier and an identifier of the vehicle.

13. A device for starting a vehicle, wherein the device is used in a server, and the device comprises:

a transceiver, configured to communicate with an apparatus other than the device;
a memory, configured to store a computer executable instruction; and
one or more processors, connected to the memory and the transceiver through a bus, wherein when the computer executable instruction stored in the memory is executed by the one or more processors, the computer executable instruction causes the device to perform a method including:
obtaining first security information and second security information that are of the vehicle, wherein the first security information and the second security information verify a vehicle start instruction sent by a mobile terminal to a telematics box;
sending the first security information and indication information of the vehicle to the mobile terminal through a secure transmission protocol or a secure transmission channel; and
sending the second security information and a user identifier of the mobile terminal to the telematics box of the vehicle, wherein the indication information identifies the vehicle.

14. The device according to claim 13, wherein the computer executable instruction further causes the device to:
receive a first vehicle start instruction sent by the mobile terminal, wherein the first vehicle start instruction carries the indication information and first verification information that is obtained based on the first security information;
send a second vehicle start instruction to the telematics box based on the indication information, wherein the second vehicle start instruction carries the user identifier and second verification information that is obtained based on the second security information;
receive a first verification result obtained after the telematics box verifies the second verification information; and
send the first verification result to the mobile terminal.

15. The device according to claim 13, wherein the first security information and the second security information are same security information, and the first verification information and the second verification information are same verification information.

16. The device according to claim 14, wherein the first security information and the second security information are different security information, and the first verification information and the second verification information are different verification information; and
wherein the sending the second vehicle start instruction to the telematics box based on the indication information comprises:
obtaining the first security information based on the indication information, and verifying the first verification information based on the first security information;
in response to the verification on the first verification information being successful, obtaining the second security information based on the user identifier, and generating the second verification information based on the second security information; and
sending to the telematics box based on an identifier of the vehicle, the second vehicle start instruction that carries the second verification information.

17. The device according to claim 14, wherein both the first security information and the second security information are keys, the first vehicle start instruction further carries a first random number, the second vehicle start instruction further carries a second random number, the first verification information is obtained based on the first security information and the first random number, and the second verification information is obtained based on the second security information and the second random number.

18. The device according to claim 17, wherein the first security information is generated based on a first root key, the user identifier, and the identifier of the vehicle; and the second security information is generated based on a second root key, the user identifier, and the identifier of the vehicle.

19. The device according to claim 13, wherein the obtaining the first security information and the second security information comprises:
   generating the first security information and the second security information in response to a second verification result sent by the telematics box to the mobile terminal being received and the second verification result indicating that the verification succeeds.

20. The device according to claim 19, wherein the computer executable instruction further causes the device to:
   create registration information in response to the registration request of the mobile terminal for the telematics box, wherein the registration information indicates a correspondence between the user identifier and the identifier of the vehicle.

* * * * *